(12) United States Patent
Bhatt et al.

(10) Patent No.: US 10,974,513 B2
(45) Date of Patent: Apr. 13, 2021

(54) INK SUPPLY

(71) Applicant: HEWLETT-PACKARD DEVELOPMENT COMPANY, L.P., Spring, TX (US)

(72) Inventors: Jayprakash C. Bhatt, Corvallis, OR (US); Larrie A. Deardurff, Corvallis, OR (US); Milton Neill Jackson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 48 days.

(21) Appl. No.: 16/500,301

(22) PCT Filed: Jul. 6, 2017

(86) PCT No.: PCT/US2017/040864
§ 371 (c)(1),
(2) Date: Oct. 2, 2019

(87) PCT Pub. No.: WO2019/009900
PCT Pub. Date: Jan. 10, 2019

(65) Prior Publication Data
US 2021/0008890 A1     Jan. 14, 2021

(51) Int. Cl.
*B41J 2/175* (2006.01)
*C09D 11/38* (2014.01)
(Continued)

(52) U.S. Cl.
CPC ........ *B41J 2/17513* (2013.01); *B41M 5/0023* (2013.01); *C09D 11/033* (2013.01);
(Continued)

(58) Field of Classification Search
CPC . B41J 2/17513; B41M 5/0023; C09D 11/033; C09D 11/30; C09D 11/38; C09D 11/40; C09D 11/54
See application file for complete search history.

(56) References Cited

U.S. PATENT DOCUMENTS 5,536,306 A     7/1996   Johnson et al.
5,619,237 A     4/1997   Inoue et al.
(Continued)

FOREIGN PATENT DOCUMENTS

| EP | 0646465 | 4/1995 |
|---|---|---|
| EP | 0829374 | 3/1998 |
| EP | 1013447 | 6/2000 |

OTHER PUBLICATIONS

International Search Report and Written Opinion for International Application No. PCT/US2017/040864 dated Mar. 15, 2018, 7 pages.

*Primary Examiner* — Anh T Vo
(74) *Attorney, Agent, or Firm* — Dierker & Kavanaugh PC

(57) ABSTRACT

An example of an ink supply includes an ink chamber containing a liquid ink, a salt chamber containing a salt solution, a separator positioned between the liquid ink and the salt solution, and a release mechanism. The separator completely separates the liquid ink from the salt solution prior to the release mechanism being triggered. The release mechanism has a triggered position and a retracted position. The triggered position causes the separator to at least partially open, and enables the liquid ink and the salt solution to be combined to form a mixture.

15 Claims, 3 Drawing Sheets

(51) Int. Cl.
- *C09D 11/40* (2014.01)
- *C09D 11/54* (2014.01)
- *B41M 5/00* (2006.01)
- *C09D 11/033* (2014.01)
- *C09D 11/30* (2014.01)

(52) U.S. Cl.
CPC .............. *C09D 11/30* (2013.01); *C09D 11/38* (2013.01); *C09D 11/40* (2013.01); *C09D 11/54* (2013.01)

(56) References Cited

U.S. PATENT DOCUMENTS

| | | |
|---|---|---|
| 5,853,465 A | 12/1998 | Tsang et al. |
| 6,095,643 A | 8/2000 | Cook et al. |
| 7,705,069 B2 | 4/2010 | Reinhardt et al. |
| 7,922,314 B2 | 4/2011 | Brenner et al. |
| 9,062,217 B2 | 6/2015 | Gotou et al. |
| 2005/0248639 A1 | 11/2005 | Matsuo et al. |
| 2006/0125896 A1* | 6/2006 | Aikawa ................. B41J 2/1752 347/100 |
| 2008/0174643 A1* | 7/2008 | Notoya .................... B41J 2/175 347/86 |
| 2011/0060100 A1* | 3/2011 | Kimura ............... C09D 11/324 524/588 |

* cited by examiner

100

102

PROVIDING AN INK SUPPLY INCLUDING: AN INK CHAMBER CONTAINING A LIQUID INK; A SALT CHAMBER CONTAINING A SALT SOLUTION; A SEPARATOR POSITIONED BETWEEN THE LIQUID INK AND THE SALT SOLUTION, WHEREIN THE SEPARATOR COMPLETELY SEPARATES THE LIQUID INK FROM THE SALT SOLUTION PRIOR TO A RELEASE MECHANISM BEING TRIGGERED; AND THE RELEASE MECHANISM HAVING A TRIGGERED POSITION AND A RETRACTED POSITION, THE TRIGGERED POSITION CAUSING THE SEPARATOR TO AT LEAST PARTIALLY OPEN, AND ENABLING THE LIQUID INK AND THE SALT SOLUTION TO BE COMBINED TO FORM A MIXTURE

PROVIDING AN INK SUPPLY INCLUDING: AN INK CHAMBER CONTAINING A LIQUID INK, THE INK CHAMBER HAVING A FIRST DOCKING PORTION; A SALT CHAMBER CONTAINING A SALT SOLUTION, THE SALT CHAMBER HAVING A SECOND DOCKING PORTION THAT IS TO ENGAGE THE FIRST DOCKING PORTION; WHEREIN THE FIRST AND SECOND DOCKING PORTIONS SEAL THE RESPECTIVE INK AND SALT CHAMBERS WHEN UNENGAGED, AND RENDER THE INK AND SALT CHAMBERS IN FLUID COMMUNICATION WHEN ENGAGED SO THAT THE LIQUID INK AND THE SALT SOLUTION COMBINE TO FORM A MIXTURE

FIG. 5

INK SUPPLY

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 4 is a diagram illustrating example(s) of a method disclosed herein; and

FIG. 5 is a diagram illustrating other example(s) of a method disclosed herein.

DETAILED DESCRIPTION

Figure 1A:
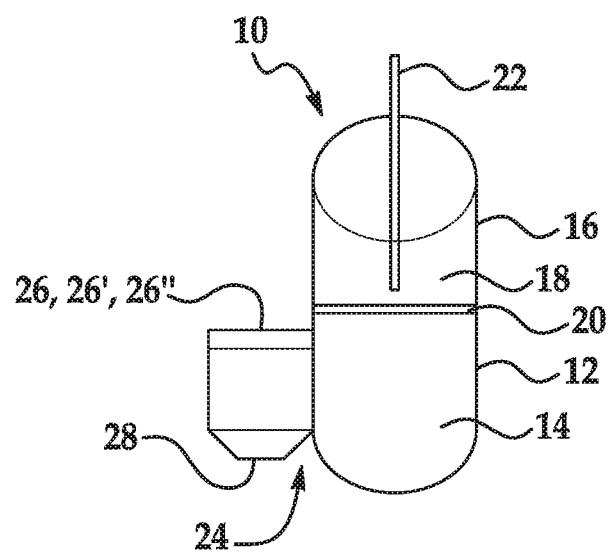
FIGS. 1A and 1B schematically depict examples of an ink supply disclosed herein.

Inkjet ink formulations may contain a wide variety of components, depending, in part, upon the jetting architecture that is used, the desired attributes of the print to be formed, and a shelf life for the ink. The desired shelf life for an ink may be relatively long, e.g., from about 2 years to about 5 years, when taking into account manufacture, storage (e.g., vendor storage, customer storage, etc.), shipping, etc. In order for the ink to remain stable and jettable over this long shelf life, the ink components should be compatible with one another over time. Moreover, in order to create quality prints over the long shelf life, the individual ink components should maintain their functionality.

An example of an ink component is an organic and/or inorganic salt. Salt(s) may be included to increase the color saturation, gamut space (i.e., the type and number of colors which originate from the combinations of color components of a color model), and/or gamut volume (i.e., how much of a color space a gamut occupies). However, it has been found that salt(s) can react with other ink components, e.g., anionic pigment(s), which may affect the ink stability, jettabilty, and ability to create quality prints over long shelf lives (e.g., >1 year to 5 years).

Examples of the ink supply disclosed herein separate specific components into different fluids and/or compositions prior to installation in a printer and/or an initial printing event. More specifically, a salt solution is maintained separately from a liquid ink or from ink components (e.g., an ink concentrate and an ink solvent, which may also be isolated from one another prior to printing). The separated salt solution and liquid ink/ink components are contained in a container that enables the salt solution and the liquid ink/ink components to be combined just prior to installation in the printer and/or the initial printing event. When combined, the salt solution and the liquid ink/ink components form a liquid ink/salt solution mixture, which is a printable/jettable ink. Since the liquid ink/salt solution mixture is generated just prior to installation in the printer and/or the initial printing event, the shelf life of the liquid ink/salt solution mixture begins just prior to installation and/or the initial printing event. As such, events such as ink manufacture, storage, and shipping are no longer factors contributing to shelf life. Thus, the desired shelf life of the liquid ink/salt solution mixture disclosed herein is relatively short (e.g., from about 3 months to about 12 months for consumer and small offices, or from about 1 week to about 2 months for a commercial print shop or printing press), and the liquid ink/salt solution mixture stability can be maintained over this time period. While example shelf lives have been provided, it is to be understood that the desired shelf life may be longer or shorter depending, in part, upon the final formulation of the liquid ink/salt solution mixture and the interaction of the components therein.

Stability performance can be measured in terms of physical stability. The term "physical stability," as referred to herein, means the ability of the colorant particles in the inkjet ink to remain substantially unchanged over time. To determine the physical stability of an ink, the change in particle size may be measured over time, and the percentage of size change may be determined. The particle size may be considered to be "substantially unchanged over time" when the percentage of size change is 10% or less. Particle size may be measured using dynamic light scattering.

To facilitate the measurement of the particle size percentage change, the ink formulations may be stored in an accelerated storage (AS) environment. The particle size may be measured before and after the ink formulations have been stored in the AS environment. The accelerated storage environment may be an environment that has a temperature ranging from about 45° C. to about 60° C. In an example, the accelerated storage environment is in an oven baked at a temperature of about 60° C. and the ink formulations are stored in the AS environment for about twelve (12) weeks. For inkjet inks, it is generally assumed that 6 weeks at 60° C. is about the same as 18 months at ambient temperature. In the example above, the 12 weeks at 60° C. would represent about 3 years at ambient temperature.

A large particle size change can deleteriously affect the ink formulation. As one example, a large particle size change may result from phase separation in the bulk ink (e.g., pigments separating from the vehicle, agglomerating with one another, and/or settling), which would cause the ink to be unusable. A large particle size change may also alter the jettability performance and/or the image quality performance. Pigment agglomeration and/or settling may render the ink more difficult to jet.

Figure 1B:
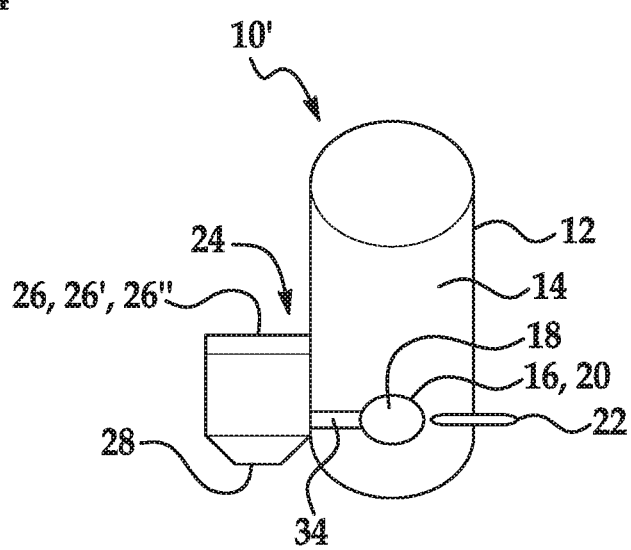

Referring now to FIGS. 1A and 1B, examples of an ink supply 10, 10' are schematically depicted. It is to be understood that the ink supply 10, 10' may include additional components and that some of the components described herein may be modified. Furthermore, components of the ink supply 10, 10' depicted in FIGS. 1A and 1B may not be drawn to scale and thus, the ink supply 10, 10' may have a different size and/or configuration other than as shown therein.

In an example, the ink supply 10, 10' comprises an ink chamber 12 containing a liquid ink 14; a salt chamber 16 containing a salt solution 18; a separator 20 positioned between the liquid ink 14 and the salt solution 18, wherein the separator 20 completely separates the liquid ink 14 from the salt solution 18 prior to a release mechanism 22 being triggered; and the release mechanism 22 having a triggered position and a retracted position, the triggered position causing the separator 20 to at least partially open, and enabling the liquid ink 14 and the salt solution 18 to be combined to form a mixture.

As shown in FIGS. 1A and 1B, the ink supply 10, 10' includes the ink chamber 12 containing the liquid ink 14. The ink chamber 12 may be a fluid reservoir defined by any container that is capable of holding, storing, etc. the liquid ink 14. In an example, the ink chamber 12 may be at least partially filled with the liquid ink 14, and the container defining the ink chamber 12 may be sealed to prevent leakage and/or mixing prior to the release mechanism 22 being triggered. The container defining the ink chamber 12 may be formed of a plastic, a material with an interior plastic coating, a ceramic, a metal alloy that does not react with components in the liquid ink 14, or another suitable material that does not react with components in the liquid ink.

The volume of the ink chamber 12 may vary depending, in part, on the volume of the liquid ink 14 contained therein. In some examples, the entire salt solution 18 may be introduced into the ink chamber 12 to form the liquid ink/salt solution mixture. As such, in an example, the ink chamber 12 has a volume sufficient to contain the liquid ink 14 and the salt solution 18.

As mentioned above, the salt solution 18 is maintained separately from the liquid ink 14. As such, the liquid ink 14 is devoid of a salt contained in the salt solution. The liquid ink 14 may include some salt, because a dispersant and/or a binder present in the liquid ink 14 may be in salt form. However, dispersant and/or binder salts are polymeric salts, and are not the mono-valent metallic salts, multi-valent metallic salts, or organo-metallic salts that are present in the salt solution. Moreover, the cations present in the dispersant and/or binder salts may be less than 10,000 parts per million (ppm), and thus are too low to generate instability. The absence of the salt solution salt enhances the stability of the liquid ink 14, in part because the pigment(s) in the liquid ink 14 may not agglomerate as a result of interaction with these particular salt(s). As such, in the liquid ink 14 disclosed herein, pigment particle size percentage change may be reduced (as compared to an ink similar to the liquid ink 14, but that contains the salt of the salt solution).

In an example, the liquid ink 14 includes a colorant and an ink vehicle, the ink vehicle including water, a co-solvent, a surfactant, or a combination thereof. In some examples, the liquid ink 14 consists of these components, with no other components. In other examples, the liquid ink 14 and/or the ink vehicle may include different and/or additional components. For example, the liquid ink 14 may include a binder in addition to the colorant and the ink vehicle (including, for example, water, the co-solvent, the surfactant, or a combination thereof).

As used herein, the terms "ink vehicle," "liquid vehicle," and "vehicle" may refer to the liquid fluid in which the colorant (e.g., a pigment dispersion), alone or in combination with the binder (e.g., a polyurethane dispersion, a latex, or combinations thereof), is/are placed to form the liquid ink 14. A wide variety of liquid vehicles may be used in the liquid ink 14 of the present disclosure. In some examples, the liquid ink 14 consists of the colorant and the ink vehicle with no other components. In some other examples, the liquid ink 14 consists of the colorant, the binder, and the ink vehicle with no other components. The ink vehicle may include water alone or in combination with a variety of additional components. Examples of these additional components may include co-solvent(s), surfactant(s), antimicrobial agent(s), sequestering agent(s), viscosity modifier(s) and/or anti-kogation agent(s).

The ink vehicle may include co-solvent(s). The co-solvent(s) may be present in an amount ranging from about 2 wt % to about 20 wt % (based on the total wt % of the liquid ink 14). It is to be understood that other amounts outside of these examples and ranges may also be used.

Examples of co-solvents that may be included in the ink vehicle include alcohols, aliphatic alcohols, aromatic alcohols, diols, glycol ethers, polyglycol ethers, 2-pyrrolidinones (i.e., 2-pyrrolidones), caprolactams, formamides, acetamides, and long chain alcohols. Examples of such compounds include primary aliphatic alcohols, secondary aliphatic alcohols, 1,2-alcohols, 1,3-alcohols, 1,5-alcohols, N-alkyl caprolactams, unsubstituted caprolactams, both substituted and unsubstituted formamides, both substituted and unsubstituted acetamides, and the like. Specific examples of alcohols may include ethanol, isopropyl alcohol, butyl alcohol, and benzyl alcohol. Examples of glycol ether co-solvents include glycol alkyl ethers, propylene glycol alkyl ethers, and higher homologs ($C_6$-$C_{12}$) of polyethylene glycol alkyl ethers. Glycol ether co-solvents can have the molecular formula of R'—O—$CH_2CH_2OH$, where R' is a $C_1$-$C_7$ linear, branched, or cyclic alkyl group. In one specific example, the glycol ether can include ethylene glycol monobutyl ether. In other specific examples, the glycol ether can include tripropyleneglycol methyl ether, dipropylene glycol butyl ether, and/or propylene glycol phenyl ether.

The co-solvent(s) may also include a polyhydric alcohol or a polyhydric alcohol derivative. Examples of polyhydric alcohols may include ethylene glycol, diethylene glycol, propylene glycol, butylene glycol, triethylene glycol, 1,5-pentanediol, 1,2-hexanediol, 1,2,6-hexanetriol, glycerin, trimethylolpropane (i.e., 2-ethyl-2-hydroxymethyl-1,3-propanediol or EHPD), and xylitol. Examples of polyhydric alcohol derivatives may include ethylene glycol monomethyl ether, ethylene glycol mono ethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adduct of diglycerin.

The co-solvent(s) may also include a nitrogen-containing solvent or a sulfur-containing solvent. Examples of nitrogen-containing solvents may include 2-pyrrolidone, N-methyl-2-pyrrolidone, cyclohexylpyrrolidone, and triethanolamine. Examples of sulfur-containing solvents may include thiodiethanol, thiodiglycerol, sulfolane, and dimethyl sulfoxide.

In another example, the co-solvent(s) may include a humectant. An example of a suitable humectant is LIPONIC® EG-1 (LEG-1, glycereth-26, available from Lipo Chemicals). Other examples of humectants may include polyols, such as 1,2-hexanediol, 1,3-propanediol, glycerol, tri-ethylene glycol, and combinations. Other humectants can also be used. The humectant may be the sole co-solvent that is present in the ink vehicle, or the humectant may be included in the vehicle in addition to other co-solvents. In an example, the humectant may be added to the liquid ink 14 in an amount ranging from about 1 wt % to about 12 wt % (based on the total wt % of the liquid ink 14).

The liquid vehicle of the liquid ink 14 may also include surfactant(s). In any of the examples disclosed herein, the surfactant may be present in an amount ranging from about 0.1 wt % to about 2.0 wt % (based on the total wt % of the liquid ink 14).

The surfactant may include anionic and/or non-ionic surfactants. Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Specific examples of the anionic surfactant may include dodecylbenzenesulfonate, isopropylnaphthalenesulfonate, monobutylphenylphenol monosulfonate, monobutylbiphenyl sulfonate, monobutylbiphenylsul fonate, and dibutylphenylphenol disulfonate. Examples of the non-ionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol. Specific examples of the non-ionic surfactant may include polyoxyethylenenonyl phenylether, polyoxyethyleneoctyl phenylether, or polyoxyethylenedodecyl. Further examples of the non-ionic surfactant may include silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin.

In at least some examples, the ink vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

In other examples, the surfactant may include an acetylenic surfactant and/or a phosphate surfactant. In an example, the ink vehicle includes the acetylenic surfactant, and the acetylenic surfactant is non-ionic. Acetylenic surfactants can include acetylenic diols, alkoxylated acetylenic diols, and other acetylenic surfactants. Some specific examples include 2,7-dimethyl-4-octyn-3,6-diol, 7-tetradecyn-6,9-diol, 2,4,7,9-tetramethyl-5-decyne-4,7-diol, 1,4-dimethyl-1,4-bis(2-methylpropyl)-2-butyne-1,4-diylether, ethylene or propylene oxide condensates thereof, or a combination thereof. Some suitable commercially available acetylenic surfactants include SURFYNOL® and DYNOL™ surfactants available from Air Products. In another example, the ink vehicle includes the phosphate surfactant. In some examples, the phosphate surfactant can be a phosphate ester of fatty alcohols or fatty alcohol alkoxylates. In one example, the surfactant can be a mixture of mono- and diesters, and may have an acid number ranging from 50 to 150. In another example, the phosphate-containing surfactant can be of the CRODAFOS family. Specific examples include oleth-3 phosphate, oleth-10 phosphate, oleth-5 phospahte, dioleyl phosphate, ppg-5-ceteth-10 phosphate, $C_9$-$C_{15}$alkyl monophosphate, deceth-4 phosphate, and mixtures thereof. Other specific examples by tradename include CRODAFOS N3A, CRODAFOS N3E, CRODAFOS N10A, CRODAFOS HCE, CRODAFOS SG, ARLANTONE Map 950, MONOFAX 831, MONOFAS 1214, MONALUBE 215, and ATLOX DP13/6.

In some examples, the liquid vehicle may also include an additive. The additive may be an antimicrobial agent, a sequestering agent, a viscosity modifier, an anti-kogation agent, or a combination thereof. In any of the examples including the additive, the total amount of additives may be present in the liquid ink 14 in an amount ranging from about 0.01 wt % to about 20 wt % (based on the total wt % of the liquid ink 14).

As mentioned above, the liquid vehicle may also include antimicrobial agent(s). Suitable antimicrobial agents include biocides and fungicides. Example antimicrobial agents may include the NUOSEPT® (Ashland Inc.), VANCIDE® (R.T. Vanderbilt Co.), ACTICIDE® B20 and ACTICIDE® M20 (Thor Chemicals), and combinations thereof. In any of the examples disclosed herein, the liquid ink 14 may include a total amount of antimicrobial agents that ranges from about 0.1 wt % to about 2.5 wt % (based on the total wt % of the liquid ink 14). In some instances, the antimicrobial agent may be present in the pigment dispersion that is added to the other ink components.

The ink vehicle may also include a sequestering agent. The sequestering agent may be included in any example of the liquid ink 14 disclosed herein to eliminate the deleterious effects of heavy metal impurities. An example of the sequestering agent includes ethylene diamine tetra acetic acid (EDTA). In any of the examples disclosed herein, the liquid ink 14 may include the sequestering agent in an amount that ranges from about 0.01 wt % to about 2 wt % (based on the total wt % of the liquid ink 14).

The ink vehicle may also include a viscosity modifier. The viscosity modifier may be included to control the viscosity of the liquid ink 14. In an example, the liquid ink 14 may have a viscosity ranging from about 1.0 cP to about 4.0 cP. Examples of the viscosity modifier include polyvinylpyrrolidone (PVP), polyvinyl alcohol (PVOH), glycerin, cellulose and functionalized cellulosics, alginates, gums, and the like. In any example disclosed herein, the liquid ink 14 may include the viscosity modifier in an amount that ranges from about 0.01 wt % to about 10.0 wt % (based on the total wt % of the liquid ink 14).

An anti-kogation agent may also be included in the ink vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the examples of the liquid ink 14 disclosed herein in an amount ranging from about 0.1 wt % to about 1 wt % of the total wt % of the liquid ink 14. In some examples, the anti-kogation agent may improve the jettability of the liquid ink 14.

In some examples disclosed herein, the ink vehicle of the liquid ink 14 may also include material(s) for pH adjustment, preservative(s), jettability additive(s), and the like.

The liquid ink 14 may be any color, such as black, cyan, magenta, yellow, etc. As such, in addition to the ink vehicle, the liquid ink 14 also includes a colorant. In an example, the colorant includes a single pigment, and in another example, the colorant includes two or more different pigments. In any of the examples disclosed herein, the total colorant(s) may be present in the liquid ink 14 in an amount ranging from about 0.5 wt % to about 15 wt % (based on the total wt % of the liquid ink 14).

In an example, the colorant is an anionically dispersed pigment. In an example, the anionically dispersed pigment is a dispersion including water, the pigment, and an anionic polymer that disperses the pigment (i.e., the anionic polymeric dispersant). In an example, the pigment dispersion may also include, for example, a co-solvent, such as 2-pyrrolidone. The pigment dispersion may be prepared or purchased, and the other components of the ink (e.g., vehicle components) may be slowly added to the pigment dispersion with continuous mixing, to form the liquid ink 14.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a silver pigment, or a bronze pigment), a pearlescent pigment, or combinations of the same colored pigments (e.g., two different cyan pigments), and/or combinations of different colored pigments (e.g., a red pigment and a violet pigment).

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH° series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® RO100, STANDART® RO200, and DORADO® gold-bronze pigments (available from Eckart Effect Pigments, Wesel, Germany).

The average particle size of the pigments may range anywhere from about 50 nm to about 200 nm. In an example, the average particle size ranges from about 80 nm to about 150 nm.

As mentioned above, in some examples disclosed herein, the pigment may be dispersed by the anionic polymer (i.e., anionic polymeric dispersant). The dispersant may be present in an amount ranging from about 5% to about 50% of the weight of the pigment(s) (i.e., colorant(s)) in the liquid ink 14. As an example, when 15 wt % of pigment is present in the liquid ink 14, an anionic dispersant may be present in the liquid ink 14 in an amount ranging from about 0.75 wt % to about 7.5 wt %.

In other examples, the pigment may be a self-dispersing pigment. As used herein, the term "self-dispersing pigment" refers to a pigment having water-solubilizing groups on the pigment surface. The self-dispersing pigment can be dispersed in water without the polymer dispersant. In an example, the self-dispersing pigment is obtained by carrying out surface modification treatments, such as an acid/base treatment, a coupling agent treatment, a polymer graft treatment, a plasma treatment, an oxidation/reduction treatment, on a pigment. Examples of the self-dispersion type pigment may include, in addition to the above described surface modified pigment, commercially available self-dispersion pigments such as CAB-O-JET®-200, CAB-O-JET®-300, CAB-O-JET®-400, IJX-157, IJX-253, IJX-266, IJX-273, IJX-444, IJX-55, CAB-O-JET®-250C, CAB-O-JET®-260M, CAB-O-JET®-270Y, CAB-O-JET®-450C, CAB-O-JET®-465M, CAB-O-JET®-470Y, and CAB-O-JET®-480M manufactured by Cabot Corporation, and Microjet Black CWI, and CW-2 manufactured by Orient Chemical Industries Co., Ltd.

As mentioned above, examples of the liquid ink 14 may also include the binder. In an example, the binder is present in examples of the liquid ink 14 in an amount ranging from about 0.5 wt % to about 15 wt % (based on the total wt % of the liquid ink 14). Examples of the binder include a latex binder, a polyurethane binder, polystyrene-acrylate, and combination thereof.

In an example, the binder is the polyurethane binder and is present in a polyurethane dispersion with water. The polyurethane dispersion may be added with the pigment (e.g., pigment dispersion) and the components of the ink vehicle to form the liquid ink 14.

Examples of suitable polyurethanes include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a copolymer thereof, and a combination thereof.

In another example the binder is the latex binder (i.e., a polymer that is capable of being dispersed in an aqueous medium). The latex binder may be a colloidal dispersion of polymer particles in a solvent.

The polymer particles of the latex binder may have several different morphologies. For example, the polymer particles may be individual spherical particles containing polymer compositions of high $T_g$ hydrophilic (hard) component(s) and/or low $T_g$ hydrophobic (soft) component(s) that may be interdispersed according to IPN (interpenetrating networks), although it is contemplated that the high $T_g$ hydrophilic and $T_g$ hydrophobic components may be interdispersed in other ways. For another example, the polymer particles may be made of a low $T_g$ hydrophobic core surrounded by a continuous or discontinuous high $T_g$ hydrophilic shell. For another example, the polymer particle morphology may resemble a raspberry, in which a low $T_g$ hydrophobic core is surrounded by several smaller high $T_g$ hydrophilic particles that are attached to the core. For still another example, the polymer particles may include 2, 3, or 4 particles that are at least partially attached to one another.

In examples herein, high $T_g$ hydrophilic component(s)/shell/particles and low $T_g$ hydrophilic component(s)/core/particles may be defined in relation to each other (i.e., the high $T_g$ hydrophilic component(s)/shell/particles have a $T_g$ higher than the low $T_g$ hydrophilic component(s)/core/particles, and the low $T_g$ hydrophilic component(s)/core/particles have a $T_g$ lower than the high $T_g$ hydrophilic component(s)/shell/particles). In some examples, the high $T_g$ hydrophilic component(s)/shell/particles have a $T_g$ higher than 25° C. In other examples, the high $T_g$ hydrophilic component(s)/shell/particles have a $T_g$ higher than 45° C. In some examples, the low $T_g$ hydrophilic component(s)/core/particles have a $T_g$ lower than 25° C. In other examples, the low $T_g$ hydrophilic component(s)/core/particles have a $T_g$ lower than 5° C.

In some examples disclosed herein, the polymer particles of the latex binder are heteropolymers or co-polymers. The heteropolymers may include a more hydrophobic component and a more hydrophilic component. In these examples, the hydrophilic component renders the particles dispersible in the ink vehicle, while the hydrophobic component is capable of coalescing upon solvent evaporation to bind the pigment on a recording medium.

Examples of low $T_g$ monomers that may be used to form the hydrophobic component include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., a-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a high $T_g$ hydrophilic monomer, such as an acidic monomer. Examples of acidic monomers that can be polymerized in forming the polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In the heteropolymers disclosed herein, the low $T_g$ hydrophobic component(s) make up from about 65% to about 100% of the polymer, and the high $T_g$ hydrophilic component(s) make up from about 0.1° A to about 35% of the polymer.

In an example, the selected monomer(s) is/are polymerized to form the desirable heteropolymer. Any suitable polymerization process may be used. For example, hydrophobic-hydrophilic polymer particles can be formed by any of a number of techniques, such as: i) attaching a high $T_g$ hydrophilic polymer onto the surface of a low $T_g$ hydrophobic polymer, ii) copolymerizing low $T_g$ hydrophobic and high $T_g$ hydrophilic monomers using ratios that lead to a more high $T_g$ hydrophilic outer component or shell, iii) adding high $T_g$ hydrophilic monomer (or excess high $T_g$ hydrophilic monomer) toward the end of the copolymerization process so there is a higher concentration of high $T_g$ hydrophilic monomer copolymerized at or near the surface, or iv) any other method known in the art to generate a more high $T_g$ hydrophilic outer component or shell relative to the inner component or core. These hydrophobic-hydrophilic polymer particles may be core-shell particles. It is to be understood, however, that these techniques may also form polymer particles with other morphologies, as noted herein.

The polymer particles of the latex binder may have a particle size that can be jetted via thermal inkjet printing, piezoelectric printing, or continuous inkjet printing. In an example, the particle size of the polymer particles ranges from about 10 nm to about 300 nm.

The glass transition temperature $T_g$ of the bulk material (e.g., the more hydrophobic portion) of the polymer particles may range from 25° C. to about 125° C. In an example, the glass transition temperature $T_g$ of the bulk material (e.g., the more hydrophobic portion) of the polymer particles is about 40° C. or higher. The glass transition temperature $T_g$ of the bulk material may be any temperature that enables the polymer particles to be inkjet printed without becoming too soft at the printer operating temperatures.

The polymer particles of the latex binder may have a melting point ranging from about 125° C. to about 200° C. In an example, the polymer particles may have a melting point of about 160° C.

The weight average molecular weight of the polymer particles of the latex binder may range from about 5,000 Mw to about 500,000 Mw. In some examples, the weight average molecular weight of the polymer particles ranges from about 100,000 Mw to about 500,000 Mw. In some other examples, the weight average molecular weight of the polymer particles ranges from about 150,000 Mw to 300,000 Mw.

The liquid ink 14 disclosed herein may have a pH ranging from about 7 to about 10. A slight excess of the metal hydroxide base (e.g., NaOH, KOH, etc.) may be added to counteract any slight pH drop that may occur over time.

As shown in FIGS. 1A and 1B, the ink supply 10, 10' also includes the salt chamber 16 containing the salt solution 18. The salt chamber 16 may be a fluid reservoir defined by any container that is capable of holding, storing, etc. the salt solution 18. In an example, the salt chamber 16 may be at least partially filled with the salt solution 18, and the container defining the salt chamber 16 may be sealed to prevent leakage and/or mixing prior to the release mechanism 22 being triggered. The container defining the salt chamber 16 may be formed from a plastic, a material with an interior plastic coating, a ceramic, a metal alloy that does not react with components in the salt solution 18, or an elastic material, depending, in part, on whether the salt chamber 16 is also defined by the separator 20 (described further below).

The volume of the salt chamber 16 may vary depending, in part, on the volume of the salt solution 18 contained therein. In some examples, the entire liquid ink 14 may be introduced into the salt chamber 16 to form the liquid ink/salt solution mixture. As such, in an example, the salt chamber 16 has a volume sufficient to contain the liquid ink 14 and the salt solution 18.

In an example, the salt solution 18 includes a solvent and a salt selected from the group consisting of mono-valent metallic salts, multi-valent metallic salts, organo-metallic salts, wherein the metallic salt includes (i) a cation of a metal selected from the group consisting of Group I metals, Group II metals, Group III metals, transition metals, and combinations thereof, and (ii) an anion selected from the group consisting of chloride, iodide, bromide, nitrate, sulfate, sulfite, phosphate, chlorate, acetate, borate, tetrafluoroborate, propionate, and combinations thereof. In some examples, the salt solution 18 consists of these components, with no other components. In other examples, the salt solution 18 may include different and/or additional components, such as one or more of the ink vehicle components previously described (e.g., co-solvent(s), surfactant(s), antimicrobial agent(s), sequestering agent(s), viscosity modifier(s) and/or anti-kogation agent(s), but not including the colorant and/or dispersant).

The salt included in the salt solution 18 is capable of reacting with the anionic pigment(s) of the liquid ink 14 when the mixture is printed (and solvent is evaporated), which causes the pigment(s) to crash out of the mixture and fixes the pigment(s) on a medium surface. This, in turn, improves color saturation. Examples of suitable salts include mono-valent metallic salts, multi-valent metallic salts, and organo-metallic salts. The metallic salt may include a cation of a metal, such as Group I metals, Group II metals, Group III metals, or transition metals, such as sodium, calcium, copper, nickel, magnesium, zinc, barium, iron, aluminum, and chromium, and combinations thereof. The metallic salt may also include anions, such as chloride, iodide, bromide, nitrate, sulfate, sulfite, phosphate, chlorate, acetate, bromate, tetrafluoroborate, and propionate ions, and various combinations thereof. Some specific examples of the salt include potassium chloride (KCl), calcium chloride ($CaCl_2$), calcium propionate ($Ca(C_2H_5COO)_2$, also known as calcium propanoate), and calcium borate ($Ca_3(BO_3)_2$).

In an example, the salt may be present in the salt solution 18 in an amount ranging from about 0.1 wt % to about 10 wt %. A higher salt concentration in the salt solution 18 may lead to more rapid coagulation of the salt in the liquid ink/salt solution mixture. The concentration of the salt solution 18 may depend, in part, on a desired concentration of the salt in the liquid ink/salt solution mixture, the amount of the salt solution 18 present in the salt chamber 16, and whether all or a portion of the salt solution 18 is added to the liquid ink 14. In an example, the amount of the salt in the salt solution 18 and the amount of the salt solution 18 in the salt chamber 16 may be such that the salt may be present in the mixture (of the liquid ink 14 and the salt solution 18 formed when the release mechanism 22 is triggered) in an amount ranging from about 0.05 wt % to about 5 wt % (based on the total wt % of the mixture). This range of salt in the mixture may be obtained when equal volumes (i.e., 1:1 ratio) of the salt solution 18 and the liquid ink 14 are mixed together, or when the respective volumes of the salt solution 18 and the liquid ink 14 are adjusted based on the concentration of salt in the salt solution and the desired concentration of salt in the mixture.

The balance of the salt solution 18 may be the solvent. The solvent of the salt solution 18 may be water and/or another polar solvent, such as dimethyl sulfoxide, ethanol, isopropyl alcohol, butyl alcohol, etc. As previously mentioned, one or more of the ink vehicle components may also be included in some examples of the salt solution 18.

In the examples shown in FIGS. 1A and 1B, the mixture formed by combining the liquid ink 14 and the salt solution 18 may contain all of the components of the liquid ink 14 and/or the salt solution 18. Alternatively, some residual liquid ink 14 and/or residual salt solution 18 may not be combined into the mixture. In the liquid ink/salt solution mixture, the weight ratio of the salt solution 18 to the liquid ink 14 may range from about 1:10 (0.1) to about 1:1. In some instances, it may be desirable to have a 1:1 weight ratio of the salt solution 18 to the liquid ink 14. In other instances, it may be desirable to have a more concentrated salt solution 18, where a portion of the salt solution 18 in the salt chamber 16 is introduced into the ink chamber 12 to form the mixture.

Pigment stability and color performance depends, in part, upon the concentration of the salt in the mixture. As such, it is desirable that the mixture be at least substantially uniformly mixed. In some examples, the container that forms the ink chamber 12 (which, in an example, receives the salt solution 18) or the container that forms the salt chamber 16 (which, in an example, receives the liquid ink 14) includes a mechanical mixing device, an ultrasonic mixer and/or a mixing device that irradiates the mixture with microwave or radio frequency radiation.

As shown in FIGS. 1A and 1B, the ink supply 10, 10' also includes the separator 20 positioned between the liquid ink 14 and the salt solution 18. The separator 20 completely separates the liquid ink 14 from the salt solution 18 prior to the release mechanism 22 being triggered (i.e., prior to the release mechanism 22 being moved to the triggered position).

As illustrated in FIG. 1A, in one example of the ink supply 10, the separator 20 may be a wall shared by the ink chamber 12 and the salt chamber 16. In this example, the ink chamber 12 and the salt chamber 16 are positioned adjacent to one another.

In an example when the separator 20 is a wall shared by the ink chamber 12 and the salt chamber 16, the separator 20 may have an aperture (not shown) therein. In this example, the release mechanism 22 may be a sliding or rotating shutter (or a valve, plug, etc.), that when in its retracted position, covers the aperture. This example of the release mechanism 22, when moved to its triggered position, opens the aperture. The liquid ink 14 and the salt solution 18 are then able to combine through the open aperture. In some examples, it may be desirable to maintain the release mechanism 22 in the triggered position so that it does not re-cover the aperture so that all of the liquid ink 14 and the salt solution 18 mix together.

In another example when the separator 20 is a wall shared by the ink chamber 12 and the salt chamber 16, the separator 20 may able to be punctured, fractured, cracked, or ruptured by the release mechanism 22 when moved to its triggered position. An opening in the separator 20 is formed as a result of the puncturing, fracturing, cracking, or rupturing of the separator 20, and this opening enables the liquid ink 14 and the salt solution 18 to be combined.

In still another example when the separator 20 is a wall shared by the ink chamber 12 and the salt chamber 16, the separator 20 may contain an elastic membrane, a thin fracture plate, a burst disk, or the like that may be punctured, ruptured, fractured, or burst by the release mechanism 22 when moved to its triggered position. An opening in the separator 20 is formed as a result of the puncturing, rupturing, fracturing, or bursting of the separator 20, and this opening enables the liquid ink 14 and the salt solution 18 to be combined.

As illustrated in FIG. 1B, in another example of the ink supply 10', the separator 20 may be a container that defines the salt chamber 16. In this example, the salt chamber 16 is positioned within the ink chamber 12 with the liquid ink 14.

In an example, when the separator 20 defines the salt chamber 16, the separator 20 may be a capsule that is able to be crushed or cracked by the release mechanism 22 when moved to its triggered position. An opening in the separator 20 is formed as a result of the crushing or cracking of the separator 20, and this opening enables the liquid ink 14 and the salt solution 18 to be combined.

In another example when the separator 20 defines the salt chamber 16, the separator 20 may contain an elastic membrane, a thin fracture plate, a burst disk, or the like that may be punctured, ruptured, fractured, or burst by the release mechanism 22 when moved to its triggered position. An opening in the separator 20 is formed as a result of the puncturing, rupturing, fracturing, or bursting of the separator 20, and this opening enables the liquid ink 14 and the salt solution 18 to be combined.

In still another example, when the separator 20 defines the salt chamber 16, the separator 20 may be an elastic ball or balloon that may be popped by the release mechanism 22 when moved to its triggered position. An opening in the separator 20 is formed as a result of the popping of the separator 20, and this opening enables the liquid ink 14 and the salt solution 18 to be combined.

In yet another example, when the separator 20 defines the salt chamber 16, the separator 20 may be a tube that may be squeezed by the release mechanism 22 when moved to its triggered position. Squeezing forms an opening in the separator 20 that enables the liquid ink 14 and the salt solution 18 to be combined. In one example, the triggered position of the release mechanism 22 may put enough pressure on the separator 20 to cause it to burst, which creates the opening. In another example, the release mechanism may first create the opening (e.g., via puncturing), and then may squeeze the separator 20 forcing the salt solution 18 into the liquid ink 14.

In yet another example, when the separator 20 defines the salt chamber 16, the separator 20 may have an aperture therein. In this example, the release mechanism 22 may be a sliding or rotating shutter (or a valve, plug, etc.), that when in its retracted position, covers the aperture. This example of the release mechanism 22, when moved to its triggered position, opens the aperture. The liquid ink 14 and the salt solution 18 are then able to combine through the open aperture. In this example, it may be desirable to maintain the release mechanism 22 in the triggered position so that it does not re-cover the aperture.

As shown in FIG. 1B, when the separator 20 defines the salt chamber 16, it may be desirable that the separator 20/salt chamber 16 be anchored or tethered to the container that defines the ink chamber 12. Anchoring the separator 20/salt chamber 16 keeps the separator 20/salt chamber 16 from floating in the ink chamber 12, which could potentially block mixture flow during use. In the example shown in FIG. 1B, a stalk 34 (positioned opposite from the release mechanism 22) may be used that holds an elastic ball, balloon or capsule in place. The stalk 34 may be connected to a flexible cage or net (not shown) that holds the elastic ball, balloon or capsule. The stalk 34 may include a strap, a snap fit, or a hook that engages the cage or net. The cage or net may also include holes that are large enough to receive the release mechanism and release the salt solution 18, and small enough to capture any pieces of the elastic ball, balloon or capsule after rupture, burst, etc. As another example, a membrane, fracture plate, or burst disk may be attached directly to the ink chamber 12.

Alternatively, a cage or filter could be built over an intake for an output port that leads to the nozzle 28. This cage or filter may be molded into the container defining the ink chamber 12 around the output port. This cage or filter may prevent any pieces of the ruptured, burst, etc. separator 20/salt chamber 16 from completely blocking the output port when the separator 20/salt chamber 16 is not anchored or tethered.

The separator 20 material may depend, in part, on the type of release mechanism 22 that is to be used with the separator 20. In an example, the separator 20 may be formed of plastic or an elastic material. The separator 20 may be the same material as the container defining the ink chamber 12 and/or the salt chamber 16. Alternatively, separator 20 may be a material that is different than the container material in which the ink chamber 12 and/or the salt chamber 16 is defined. In an example, the separator 20 is the container that defines the salt chamber 16. In this example, the container material that defines the ink chamber 12 may be the same as, or different than the material of the separator 20. In another example, the separator 20 partially defines each of the chambers 12, 16. In this example, the separator 20 material may be the same as, or different than the material(s) that defines the remainder of the chambers 12, 16. As one specific example, the separator 20 forms a wall between the chambers 12, 16. The separator 20 may be positioned between containers that partially define the respective chambers 12, 16, or may be positioned within a single container that partially defines both of the chambers 12, 16. In this example, the container(s) may be a plastic material that is impenetrable by the release mechanism 22 while the separator 20 may be different material that is penetrable by the release mechanism 22.

As shown in FIGS. 1A and 1B, the ink supply 10, 10' further includes the release mechanism 22. The release mechanism 22 has a triggered position and a retracted position. The release mechanism 22 shown in FIGS. 1A and 1B is in the retracted position. When the release mechanism 22 is maintained the retracted position (i.e., when the release mechanism 22 has never been moved to the triggered position), the separator 20 maintains its complete separation of the liquid ink 14 and the salt solution 18. When the release mechanism 22 is moved to the triggered position, the release mechanism 22 cases the separator 20 to at least partially open, which enables the liquid ink 14 and the salt solution 18 to be combined to form the mixture.

In an example, the release mechanism 22 is selected from the group consisting of a pin, a hollow needle, a shutter, a plunger, a lever, a roller, a hammer, a pull-ribbon, a pull-tab, a screw, a wedge, a vane, a valve, a spool, an impeller, a thread, a plug, a vice, and a combination thereof. While several examples have been provided, it is to be understood that any release mechanism 22 may be used that is capable of rendering the two chambers 12, 16 in fluid communication so that the two fluids 14, 18 can form the mixture.

The release mechanism 22 shown in FIGS. 1A and 1B is the pin or the hollow needle. When the release mechanism 22 is the pin or hollow needle, the release mechanism 22 may be pushed through the separator 20 to at least partially open the separator 20 and enable the liquid ink 14 and the salt solution 18 to be combined to form the mixture. In this example, prior to the release mechanism 22 being pushed through the separator 20, the release mechanism 22 is in the retracted position, and when the release mechanism 22 is pushed through the separator 20, the release mechanism 22 is in the triggered position. In some examples, the pin or hollow needle may remain in the triggered position, and the two fluids are able to combine because the opening that forms is larger than the space occupied by the pin or hollow needle. In other examples, the pin or hollow needle may be moved back to the retracted position, and then the two fluids are able to combine through the opening previously occupied by the pin or hollow needle. In the example shown in FIGS. 1A and 1B, the diameter of the pin or hollow needle may be large enough to create an opening that enables the salt solution 18 to rapidly empty from the salt chamber 16 into the ink chamber 12. In other examples, the chambers 12, 16 may be configured so that the diameter of the pin or hollow needle creates an opening that enables the liquid ink 14 to rapidly empty from the ink chamber 12 into the salt chamber 16.

When the release mechanism 22 is the pin, the hollow needle, the lever, the hammer, the screw, the wedge, or the vane, the release mechanism 22 may be used to puncture, fracture, crack, rupture, burst, or pop the separator 20. In these examples, prior to puncturing, fracturing, cracking, rupturing, bursting, or popping the separator 20, the release mechanism 22 is in the retracted position and when the release mechanism 22 is puncturing, fracturing, cracking, rupturing, bursting, or popping the separator 20, the release mechanism 22 is in the triggered position. When the release mechanism 22 is the shutter, the plunger, the roller, the pull-ribbon, the pull-tab, the valve, the spool, the impeller, the thread, or the plug, the release mechanism 22 may cover an aperture in the separator 20 when in the retracted position, and may expose the aperture in the separator 20 when in the triggered position. When the release mechanism 22 is the plunger, the lever, the roller, the hammer, or the vice, the release mechanism 22 may be used to crush, crack, or squeeze the separator 20. In these examples, prior to crushing, cracking, or squeezing the separator 20, the release mechanism 22 is in the retracted position and when the release mechanism 22 is crushing, cracking, or squeezing the separator 20, the release mechanism 22 is in the triggered position.

The release mechanism 22 may include a metal, an elastic material, a plastic, or a combination thereof. For example, when the release mechanism 22 is the pin, the hollow needle, etc., the release mechanism 22 may be a metal. As another example, when the release mechanism 22 is the plug, the release mechanism 22 may be an elastic material (e.g., rubber). As still another example, when the release mechanism includes the pin and the vice (e.g., to create an opening in and then squeeze the separator 20), the pin portion may be metal and the vice may be metal or plastic. The material of the release mechanism 22 may depend, in part, upon the type of separator 20 that is used.

As shown in FIGS. 1A and 1B, in some examples, the ink supply 10, 10' further comprises an inkjet cartridge housing 24 defining the ink chamber 12 and the salt chamber 16, wherein the inkjet cartridge housing 24 includes: a thermal inkjet element 26, a continuous inkjet element 26', or a piezoelectric element 26" to generate a mixture droplet or a stream of mixture droplets; and a nozzle 28 for dispensing the mixture droplet or the stream of mixture droplets.

The inkjet cartridge housing 24 may be plastic or another suitable material. In one example, the housing 24 includes two separate pieces/containers, each of which has an opening. In this example, the separator 20 is attached to each of the separate pieces/containers at the opening and thus creates a fluid barrier between the two separate pieces/containers. In this example, the ink chamber 12 is defined by one of the two separate pieces/containers and the separator 20, and the salt chamber 16 is defined by the other of the two separate pieces/containers and the separator 20. In another example, the housing 24 includes a single piece/container. In this example, the separator 20 may be attached to interior walls of the piece/container, which creates the ink chamber 12, the salt chamber 16, and a fluid barrier between the chambers 12, 16.

In addition to defining the chambers 12, 16, the inkjet cartridge housing 24 may also include the thermal inkjet element 26, the continuous inkjet element 26', or the piezoelectric element 26". The thermal inkjet element 26, the continuous inkjet element 26', or the piezoelectric element 26" is used to generate a mixture droplet or a stream of mixture droplets. The inkjet cartridge housing 24 may include the thermal inkjet element 26 when the ink supply 10, 10' is to be used in a thermal inkjet printer. The thermal inkjet element 26 may be a heating element or a resistor that may heat the mixture and cause it to expand and form the mixture droplet, which may then be dispensed through the nozzle 28. The inkjet cartridge housing 24 may include the continuous inkjet element 26' when the ink supply 10, 10' is to be used in a continuous inkjet printer. The continuous inkjet element 26' may be a pump that forms the stream of mixture droplets, which may then be dispensed through the nozzle 28. The inkjet cartridge housing 24 may include the piezoelectric element 26" when the ink supply 10, 10' is to be used in a piezoelectric inkjet printer. The piezoelectric element 26" may be a piezoelectric crystal that forms the mixture droplet, which may then be dispensed through the nozzle 28.

When the ink supply 10, 10' includes the inkjet cartridge housing 24, the inkjet cartridge housing 24 includes the nozzle 28. The nozzle 28 may be a thermal inkjet print nozzle, a continuous inkjet print nozzle, or a piezoelectric inkjet print nozzle. The thermal inkjet print nozzle may be used when the thermal inkjet element 26 is used. The continuous inkjet print nozzle may be used when the continuous inkjet element 26' is used, and the piezoelectric inkjet print nozzle may be used when the piezoelectric element 26" is used.

The inkjet cartridge housing 24 may include additional inkjet architecture that may direct the mixture from the ink chamber 12 and/or the salt chamber 16 to be ejected through the nozzle 28 with the use of the thermal inkjet element 26, the continuous inkjet element 26', or the piezoelectric element 26". Depending upon which element 26, 26', 26" is used, the housing 24 may also include additional components that facilitate jetting (e.g., diaphragms, coils, conductors, etc.) Moreover, the inkjet cartridge housing 24 may include electronic components (e.g., contacts, chips, etc.) that communicate with the printer.

The example of the ink supply 10, 10', which includes the inkjet cartridge housing 24, is an integrated print head. The integrated print head includes the ink supply components and the print head components directly attached to one another within the same unit. In another example, the print head components (e.g., thermal inkjet element 26, the continuous inkjet element 26', or the piezoelectric element 26") may be part of a separate print head that is in fluid communication with the ink supply 10, 10' through tubing on-board a printer.

Figure 2:
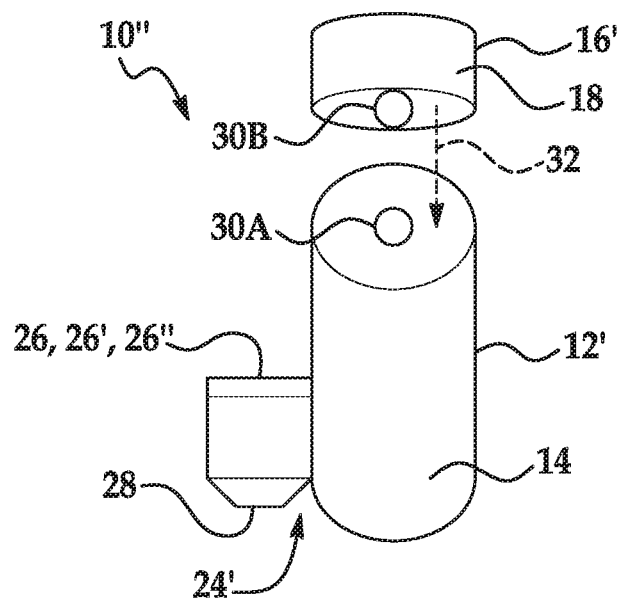
FIG. 2 schematically depicts another example of an ink supply disclosed herein.

Referring now to FIG. 2, another example of an ink supply 10" is schematically depicted. It is to be understood that the ink supply 10" may include additional components and that some of the components described herein may be modified. Furthermore, components of the ink supply 10" depicted in FIG. 2 may not be drawn to scale and thus, the ink supply 10" may have a different size and/or configuration other than as shown therein.

In an example, the ink supply 10" comprises an ink chamber 12' containing a liquid ink 14, the ink chamber 12' having a first docking portion 30A; a salt chamber 16' containing a salt solution 18, the salt chamber 16' having a second docking portion 30B that is to engage the first docking portion 30A; wherein the first and second docking portions 30A, 30B seal the respective ink and salt chambers 12', 16' when unengaged, and render the ink and salt chambers 12', 16' in fluid communication when engaged so that the liquid ink 14 and the salt solution 18 combine to form a mixture.

As shown in FIG. 2, the ink supply 10" includes the ink chamber 12' containing the liquid ink 14 and the salt chamber 16' containing the salt solution 18. The liquid ink 14 may be as described above in reference to FIGS. 1A and 1B. In an example, the liquid ink 14 is devoid of a salt contained in the salt solution 18. In another example, the liquid ink 14 includes a colorant and an ink vehicle, the ink vehicle including water, a co-solvent, a surfactant, or a combination thereof. The salt solution 18 may also be as described above in reference to FIGS. 1A and 1B. In an example, the salt solution 18 includes a solvent and a salt selected from the group consisting of mono-valent metallic salts, multi-valent metallic salts, organo-metallic salts, and combinations thereof, wherein the metallic salt includes (i) a cation of a metal selected from the group consisting of Group I metals, Group II metals, Group III metals, transition metals, and combinations thereof, and (ii) an anion selected from the group consisting of chloride, iodide, bromide, nitrate, sulfate, sulfite, phosphate, chlorate, acetate, borate, tetrafluoroborate, propionate, and combinations thereof. The mixture formed by combining the liquid ink 14 and the salt solution 18 may also be as described above in reference to FIGS. 1A and 1B.

In the example shown in FIG. 2, the ink chamber 12' and the salt chamber 16' are separate from each other, and are defined by separate containers. In an example, the ink chamber 12' and the salt chamber 16' may each be defined within a separate inkjet cartridge. The containers of the ink chamber 12' and the salt chamber 16' also may, respectively, be any of the materials previously described for the containers of the ink chamber 12 and the salt chamber 16 described above in reference to FIGS. 1A and 1B.

The ink chamber 12' is associated with a first docking portion 30A and the salt chamber 16' is associated with a second docking portion 30B. In an example, the container defining the ink chamber 12' may be integrally formed with or attached to the first docking portion 30A, and the ink chamber 12' is in fluid communication with the first docking portion 30A. Similarly, the container defining the salt chamber 16' may be integrally formed with or attached to the second docking portion 30B, and the salt chamber 16' is in fluid communication with the second docking portion 30B. The first and second docking portions 30A, 30B are shown schematically in FIG. 2. The first and second docking portions 30A, 30B seal the respective ink and salt chambers 12', 16' when unengaged within one another. When first and second docking portions 30A, 30B are engaged, the first and second docking portions 30A, 30B render the ink and salt chambers 12', 16' in fluid communication so that the liquid ink 14 and the salt solution 18 combine to form a mixture.

In an example, the first docking portion 30A may be a sealed grommet and the second docking portion 30B may be a cylinder. In this example, the cylinder may be pushed through the grommet to break or rupture the seal and an implement (e.g., an implement with sharp spikes arranged in the shape of a star) within the grommet and/or the ink chamber 12' may slice open a seal within the cylinder. The ink and salt chambers 12', 16' may be in fluid communication through the opened seals and/or the cylinder. In another example, the first docking portion 30A may include a removable lid as part of the container that defines the ink chamber 12'. The lid may be opened, and the salt chamber 16' may be placed inside before the lid is replaced. In this example, the lid may rupture or squeeze the second docking portion 30B (which may be the entire salt chamber 16') as the lid is being replaced so that the salt solution 18 may be emptied into the ink chamber 12'. In still another example, the first docking portion 30A may be a diaphragm and the second docking portion 30B may be a hypodermic needle. In this example, the hypodermic needle may be pushed through the diaphragm and the salt solution 18 may be injected into the ink chamber 12' through the needle. In this example, the diameter of the needle may be large enough so that the salt solution 18 may be injected relatively rapidly into the ink chamber 12'.

As shown in FIG. 2, the ink and salt chambers 12', 16' may be pushed together in the direction of the arrow 32 to engage the first and second docking portions 30A, 30B. In other examples (not shown) the first and second docking portions 30A, 30B may be engaged in another manner (e.g., twisting the ink chamber 12' and/or the salt chamber 16'). When the docking portions 30A, 30B are engaged and the ink and salt chambers 12', 16' are in fluid communication, the entire salt solution 18 may be introduced into the ink chamber 12' to form the liquid ink/salt solution mixture, and as such, the ink chamber 12' may have a volume sufficient to contain both the liquid ink 14 and the salt solution 18. Alternatively, the chambers 12', 16' may be configured so that the entire liquid ink 14 may be introduced into the salt chamber 16' to form the liquid ink/salt solution mixture, and as such, the salt chamber 16' may have a volume sufficient to contain both the liquid ink 14 and the salt solution 18.

As mentioned above, it is desirable that the mixture be at least substantially uniformly mixed. In some examples, the container that forms the ink chamber 12' (which, in an example, receives the salt solution 18) or the container that forms the salt chamber 16; (which, in an example, receives the liquid ink 14) includes a mechanical mixing device, an ultrasonic mixer and/or a mixing device that irradiates the mixture with microwave or radio frequency radiation.

It is to be understood that in these examples, the containers forming the ink and salt chambers 12', 16' may be anchored together once the docking portions 30A and 30B are engaged. In some instances, anchoring the containers keeps the containers from becoming detached. In other instances (e.g., when the lid rupture or squeezes the second docking portion 30B), anchoring the containers keeps one of the containers from floating in the other of the containers, which could potentially block mixture flow during use.

The first and second docking portions 30A, 30B may be plastic, metal, a material with an interior plastic coating, a ceramic, an elastic material, or a combination thereof. For example, when the first docking portion 30A is the sealed grommet, the first docking portion 30A may be a combination of metal and elastic material. As another example, when the second docking portion 30B is to be ruptured or squeezed by the lid of the container defining the ink chamber 12', the second docking portion 30B may be plastic.

The first docking portion 30A may be the same material as, or a different material than, the container defining the ink chamber 12'. Similarly, the second docking portion 30B may be the same material as, or a different material than, the container defining the salt chamber 16'. In an example, the second docking portion 30B is the container that defines the salt chamber 16'. In this example, the container material that defines the ink chamber 12' may be the same as, or different than the material of the second docking portion 30B. As another example, first docking portion 30A may be a material that is different than the material of the container that at least partially defines the ink chamber 12'. The use of different materials in this example may be desirable when the ink chamber container would be difficult to engage with the second docking portion 30B to render the chambers 12', 16' in fluid communication.

In some examples, prior to engaging the first docking portion 30A and the second docking portion 30B, the ink chamber 12' may be tethered to the salt chamber 16' (e.g., the respective containers or cartridges may be tethered together). It may be desirable to tether the ink chamber 12' to the salt chamber 16' so that they are not lost.

In some examples of the ink supply 10", the ink chamber 12' or the salt chamber 16' is an inkjet cartridge housing 24' including: a thermal inkjet element 26, a continuous inkjet element 26', or a piezoelectric element 26" to generate a mixture droplet or a stream of mixture droplets; and a nozzle 28 for dispensing the mixture droplet or the stream of mixture droplets. In the example shown in FIG. 2, the ink chamber 12' is the inkjet cartridge housing 24'. In this example, when the chambers 12', 16' are fluidically connected via the docking portions 30A, 30B, the inkjet cartridge housing 24' enables the formed mixture to be jetted therefrom.

The inkjet cartridge housing 24' may be plastic or another suitable material. In an example, the inkjet cartridge housing 24' may define the ink chamber 12' and may be integrally formed with or attached to the first docking portion 30A. In another example, the inkjet cartridge housing 24' may define the salt chamber 16' and may be integrally formed with or attached to the second docking portion 30B.

The inkjet cartridge housing 24' also includes the thermal inkjet element 26, the continuous inkjet element 26', or the piezoelectric element 26". The thermal inkjet element 26, the continuous inkjet element 26', or the piezoelectric element 26" is used to generate a mixture droplet or a stream of mixture droplets, and may be any of the examples described above in reference to FIGS. 1A and 1B. The inkjet cartridge housing 24' also includes the nozzle 28, which may be as described above in reference to FIGS. 1A and 1B.

Similar to the inkjet cartridge housing 24, the inkjet cartridge housing 24' may include additional inkjet architecture that may direct the mixture from the ink chamber 12' and/or the salt chamber 16' to be ejected through the nozzle 28 with the use of the thermal inkjet element 26, the continuous inkjet element 26', or the piezoelectric element 26". The inkjet cartridge housing 24' may also include other components as previously described herein in reference to the inkjet cartridge housing 24.

The example of the ink supply 10", which includes the inkjet cartridge housing 24', is an integrated print head. The integrated print head includes the ink supply components and the print head components directly attached to one another within the same unit. In another example, the print head components (e.g., thermal inkjet element 26, the continuous inkjet element 26', or the piezoelectric element 26") may be part of a separate print head that is in fluid communication with the ink supply 10" through tubing on-board a printer.

Figure 3A:
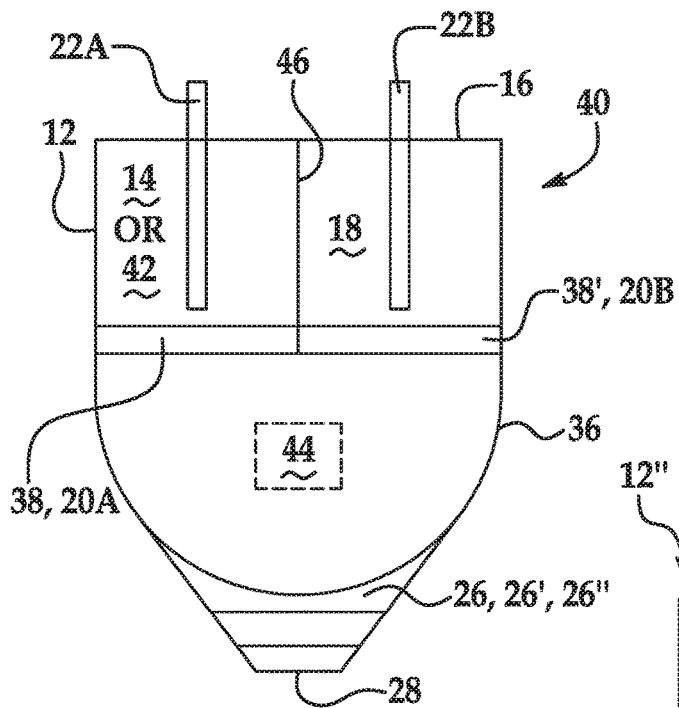
FIGS. 3A through 3C schematically depict other examples of an ink supply disclosed herein.
Figure 3B:
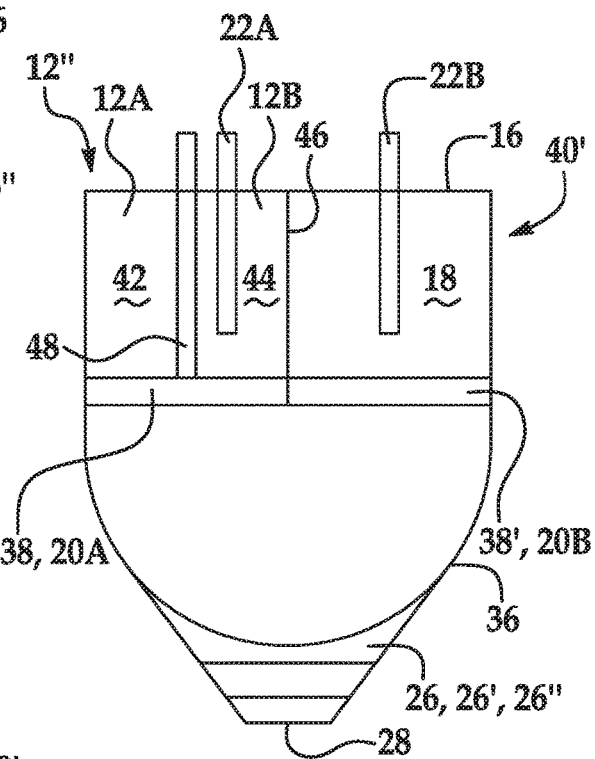
Figure 3C:
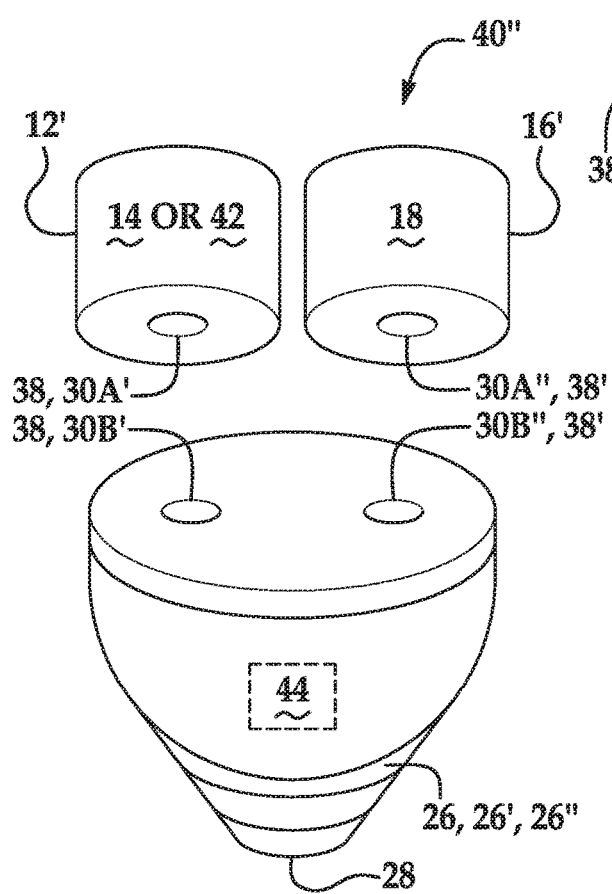

Referring now to FIGS. 3A through 3C, still other examples of the ink supply 40, 40', 40" are depicted. It is to be understood that the ink supply 40, 40', 40" may include additional components and that some of the components described herein may be modified. Furthermore, components of the ink supply 40, 40', 40" depicted in FIGS. 3A through 3C may not be drawn to scale and thus, the ink supply 40, 40', 40" may have a different size and/or configuration other than as shown therein.

In an example, each of the ink supplies 40, 40', 40" includes an ink chamber 12, 12', 12", a salt chamber 16, 16' containing a salt solution 18; a mixing chamber 36 in selective fluid communication with each of the ink chamber 12, 12', 12" and the salt chamber 16, 16'; and respective mechanisms 38, 38' i) sealing the ink chamber 12, 12', 12" from the mixing chamber 36 and sealing the salt chamber 16, 16' from the mixing chamber 36 when unengaged or prior to a release mechanism 22 being triggered; and ii) rendering the ink chamber 12, 12', 12" and the mixing chamber 36 in fluid communication and rendering the salt chamber 16, 16' and the mixing chamber 36 in fluid communication when engaged or subsequent to the release mechanism 22 being triggered, so that at least some of the salt solution 18 can combine, in the mixing chamber, with an ink component to form a mixture.

As will be described further below, the ink component in these three-chamber ink supplies 40, 40', 40" may take on different forms. As examples, i) the ink component is a liquid ink 14 devoid of a salt contained in the salt solution 18, and the ink chamber 12, 12' contains the liquid ink 14 (see FIGS. 3A and 3C); or ii) the ink component includes an ink solvent 42 devoid of a salt contained in the salt solution 18 and a concentrated ink 44 devoid of the salt contained in the salt solution 18, the ink chamber 12, 12' contains the ink solvent 42, and the mixing chamber 36 contains the concentrated ink 44 (see FIGS. 3A and 3C); or iii) the ink component includes an ink solvent 42 devoid of a salt contained in the salt solution 18 and a concentrated ink 44 devoid of the salt contained in the salt solution 18, and the ink chamber 12" includes separate sub-chambers 12A, 12B respectively containing the ink solvent 42 and the concentrated ink 44.

Also as will be described further below, the mechanisms 38, 38' may be similar to the separator 20 or the docking portions 30A, 30B. Furthermore, the release mechanisms 22A, 22B shown in FIGS. 3A and 3B may be similar to the previously described release mechanism 22.

Referring specifically to FIG. 3A, the ink supply 40 includes the ink chamber 12, the salt chamber 16 containing a salt solution 18, and the mixing chamber 36 in selective fluid communication with each of the ink and salt chambers 12, 16.

The ink chamber 12 and the salt chamber 16 in ink supply 40 are separate from each other, and they may be defined by separate containers or by a single container having a wall 46 that fluidically separates the chambers 12, 16. The containers or the container and the wall 46 defining the chambers 12, 16 may be any of the materials previously described for the containers of the ink chamber 12 and the salt chamber 16 described above in reference to FIGS. 1A and 1B.

In this example, each of the ink chamber 12 and the salt chamber 16 is sealed from the mixing chamber 36 until it is desirable to use the ink supply 40. The chambers 12, 16 are sealed by respective mechanisms 38, 38', which include a first separator 20A positioned between the ink chamber 12 and the mixing chamber 36; and a second separator 20B positioned between the salt chamber 16 and the mixing chamber 36; and the release mechanism 22 includes a first release mechanism 22A having a first triggered position and a first retracted position, the first triggered position causing the first separator 20A to at least partially open; and a second release mechanism 22B having a second triggered position and a second retracted position, the second triggered position causing the second separator 20B to at least partially open.

Any of the separators 20 previously described herein in reference to FIG. 1A may be used for the first and second separators 20A, 20B. Similarly, any of the release mechanisms 22 previously described herein in reference to FIG. 1A may be used for the first and second release mechanisms 22A, 22B.

In one example, the ink chamber 12 contains the previously described liquid ink 14 and the salt chamber 16 contains the previously described salt solution 18. When it is desired to form the mixture using the ink supply 40, the first and second release mechanisms 22A, 22B may be moved to the triggered position.

The first release mechanism 22A may be moved to open an aperture in, or to create an opening in the first separator 20A. In this example, the liquid ink 14 contained in the ink chamber 12 dispenses into the mixing chamber 36. Depending upon the type of first separator 20A and first release mechanism 22A, all of the liquid ink 14 may be dispensed into the mixing chamber 36, or a portion of the liquid ink 14 may be dispensed into the mixing chamber 36. For example, when a valve or plug selectively blocks an aperture in the first separator 20A, a predetermined amount of the liquid ink 14 may be dispensed into the mixing chamber 36.

The second release mechanism 22B may be moved to open an aperture in, or to create an opening in the second separator 20B. In this example, the salt solution 18 contained in the salt chamber 16 dispenses into the mixing chamber 36. Depending upon the type of second separator 20B and second release mechanism 22B, all of the salt solution 18 may be dispensed into the mixing chamber 36, or a portion of the salt solution 18 may be dispensed into the mixing chamber 36. For example, when a valve or plug selectively blocks an aperture in the second separator 20B, a predetermined amount of the salt solution 18 may be dispensed into the mixing chamber 36.

When both the liquid ink 14 and the salt solution 18 are dispensed into the mixing chamber 36, the mixture forms. In some examples, the mixing chamber 36 has a volume sufficient to contain all of the liquid ink 14 and all of the salt solution 18 contained in the respective chambers 12, 16. In other examples, the mixing chamber 36 may be a firing chamber, and thus may have a volume sufficient to contain a portion of the liquid ink 14 and a portion of the salt solution 18 to form enough of the mixture to be printed from the firing chamber.

The mixing chamber 36 may be equipped with the mechanical mixing device and/or the ultrasonic mixer and/or a mixing device that irradiates the mixture with microwave or radio frequency radiation. This mixer/mixing device may be used in order to ensure sufficient and at least substantial uniform mixing within the predetermined time period (described below in reference to FIGS. 4 and 5).

In another example, the ink chamber 12 contains the ink solvent 42 and the salt chamber 16 contains the previously described salt solution 18. In this example, the mixing chamber 36 may contain the concentrated ink 44.

The concentrated ink 44 is dispersible in the ink solvent 42 when it is desirable to form the liquid ink 14 (which will be mixed with the salt solution 16). In an example, the concentrated ink 44 has a liquid composition that is present in an amount that is less than about 60 wt % of the total wt % of the concentrated ink 44. The concentrated ink 44 further includes non-volatile solids (NVS) present in an amount ranging from about 40 wt % to about 90 wt % of the concentrated ink 44. In an example, the concentrated ink 44 includes any of the pigments disclosed herein in an amount ranging from about 25 wt % to about 70 wt % of the total NVS in the concentrated ink 44 and a dispersant (which includes any of the dispersants disclosed herein) in an amount ranging from about 2 wt % to about 30 wt %, or from about 5 wt % to about 20 wt % of the total NVS in the concentrated ink 44.

The liquid composition of the concentrated ink 44 may include any of the ink vehicle components previously described (e.g., co-solvent(s), surfactant(s), antimicrobial agent(s), sequestering agent(s), viscosity modifier(s) and/or anti-kogation agent(s)), as long as the total wt % of the ink vehicle in the concentrate is less than about 60 wt % of the total wt % of the concentrated ink 44.

As mentioned above, in this example, the ink chamber 12 contains the ink solvent 42. The ink solvent 42 may be a carrier fluid that constitutes the bulk of the ink vehicle, such as water or water and co-solvent(s). The ink solvent 42 may be alternatively be the ink vehicle, including any of the previously listed components except for the colorant and the dispersant.

It is to be understood that when combined, the ink solvent 42 and the ink concentrate 44 form the liquid ink 14, having the component(s) previously described herein within the desired weight ranges previously described herein.

When it is desired to form the mixture (from the ink concentrate 44, the ink solvent 42, and the salt solution 18) using the ink supply 40, the first and second release mechanisms 22A, 22B may be moved to the triggered position.

The first release mechanism 22A may be moved to open an aperture in, or to create an opening in the first separator 20A. In this example, the ink solvent 42 contained in the ink chamber 12 dispenses into the mixing chamber 36, which contains the ink concentrate. The mixing chamber 36 may be mechanically mixed, ultrasonicated, or otherwise mixed to form the liquid ink 14.

The second release mechanism 22B may be moved to open an aperture in, or to create an opening in the second separator 20B. In this example, the salt solution 18 contained in the salt chamber 16 dispenses into the mixing chamber 36.

When both the ink solvent 42 and the salt solution 18 are dispensed into the mixing chamber 36 containing the ink concentrate 44, the mixture forms. In some examples, the mixing chamber 36 has a volume sufficient to contain all of the ink solvent 42 and all of the salt solution 18 contained in the respective chambers 12, 16.

In either of the previously described examples, the ink supply 40 may be an integrated print head that includes the ink supply components and the print head components directly attached to one another within the same unit. The print head components include those previously described, such as the thermal inkjet element 26, the continuous inkjet element 26', or the piezoelectric element 26", the nozzle(s) 28, and any additional inkjet architecture that may direct the mixture from the mixing chamber 36 to be ejected through the nozzle(s) 28. In one example of the integrated print head, the mixing chamber 36 may be in fluid communication with a firing chamber of the print head, or may be the firing chamber of the print head. When the ink concentrate 44 is used, the mixing chamber 36 is not a firing chamber. In examples where the mixing chamber 36 is the firing chamber, less than all of the liquid ink supply and less than all of the salt solution supply may be dispensed from the respective chambers 12, 16 to the mixing/firing chamber as the volume of the firing chamber may be too small to contain all of the liquid ink 14 and salt solution 18.

In another example, the print head components (e.g., thermal inkjet element 26, the continuous inkjet element 26', or the piezoelectric element 26") may be part of a separate print head that is in fluid communication with the ink supply 40 (and in particular, the mixing chamber 36) through tubing on-board a printer.

Referring specifically to FIG. 3B, the ink supply 40' includes the ink chamber 12", the salt chamber 16 containing a salt solution 18, and the mixing chamber 36 in selective fluid communication with each of the ink and salt chambers 12", 16.

The ink chamber 12" and the salt chamber 16 in ink supply 40' are separate from each other, and they may be defined by separate containers or by a single container having a wall 46 that fluidically separates the chambers 12", 16. The containers or the container and the wall 46 defining the chambers 12", 16 may be any of the materials previously described for the containers of the ink chamber 12 and the salt chamber 16 described above in reference to FIGS. 1A and 1B.

In this example, the ink chamber 12" is sub-divided into separate chambers 12A, 12B. One of the sub-chambers 12A or 12B may contain the previously described ink solvent 42, and the other of the sub-chambers 12B or 12A may contain the previously described concentrated ink 44. A separator 48 may be positioned between the two sub-chambers 12A, 12B. This separator 48 may completely seal the sub-chambers 12A, 12B from one another until it is desirable to form the liquid ink 14. In an example, the separator 48 may be a plastic membrane with a pull tab that can be removed from the ink supply 40' when it is desirable to form the liquid ink 14. When the separator 48 is removed, the ink solvent 42 disperses the concentrated ink 44 to form the liquid ink 14 in the chamber 12". The resulting liquid ink 14 may have the component(s) previously described herein within the desired weight ranges previously described herein.

In this example, each of the ink chamber 12" and the salt chamber 16 is sealed from the mixing chamber 36 until it is desirable to use the ink supply 40'. The chambers 12", 16 are sealed by respective mechanisms 38, 38', which include a first separator 20A positioned between the ink chamber 12" and the mixing chamber 36; and a second separator 20B positioned between the salt chamber 16 and the mixing chamber 36; and the release mechanism 22 includes a first release mechanism 22A having a first triggered position and a first retracted position, the first triggered position causing the first separator 20A to at least partially open; and a second release mechanism 22B having a second triggered position and a second retracted position, the second triggered position causing the second separator 20B to at least partially open.

Any of the separators 20 previously described herein in reference to FIG. 1A may be used for the first and second separators 20A, 20B. Similarly, any of the release mechanisms 22 previously described herein in reference to FIG. 1A may be used for the first and second release mechanisms 22A, 22B.

When it is desired to form the mixture using the ink supply 40', the separator 48 may be removed to form the liquid ink 14, and then the first and second release mechanisms 22A, 22B may be moved to the triggered position.

The first release mechanism 22A may be moved to open an aperture in, or to create an opening in the first separator 20A. In this example, the liquid ink 14 formed in the ink chamber 12" (from the ink concentrate 44 and the ink solvent 42 initially contained therein) dispenses into the mixing chamber 36.

The second release mechanism 22B may be moved to open an aperture in, or to create an opening in the second separator 20B. In this example, the salt solution 18 contained in the salt chamber 16 dispenses into the mixing chamber 36.

When both the liquid ink 14 and the salt solution 18 are dispensed into the mixing chamber 36, the mixture forms. In this example, the mixing chamber 36 has a volume sufficient to contain all of the liquid ink 14 and all of the salt solution 18 contained in the respective chambers 12, 16.

The mixing chamber 36 may be equipped with the mechanical mixing device and/or the ultrasonic mixer and/or the mixing device that irradiates the mixture with microwave or radio frequency radiation. This mixer/mixing device may be used in order to ensure sufficient and at least substantial uniform mixing within the predetermined time period (described below in reference to FIGS. 4 and 5).

In this example, the ink supply 40' may be an integrated print head that includes the ink supply components and the print head components directly attached to one another within the same unit. The print head components include those previously described, such as the thermal inkjet element 26, the continuous inkjet element 26', or the piezoelectric element 26", the nozzle(s) 28, and any additional inkjet architecture that may direct the mixture from the mixing chamber 36 to be ejected through the nozzle(s) 28. In one example of the integrated print head, the mixing chamber 36 may be in fluid communication with a firing chamber of the print head. In another example, the print head components (e.g., thermal inkjet element 26, the continuous inkjet element 26', or the piezoelectric element 26") may be part of a separate print head that is in fluid communication with the ink supply 40' (and in particular, the mixing chamber 36) through tubing on-board a printer.

Referring specifically to FIG. 3C, the ink supply 40" includes the ink chamber 12', the salt chamber 16' containing a salt solution 18, and the mixing chamber 36 in selective fluid communication with each of the ink and salt chambers 12', 16'.

The ink chamber 12' and the salt chamber 16 in ink supply 40" are separate from each other, and they may be defined by separate containers. The containers may be any of the materials previously described for the containers of the ink chamber 12' and the salt chamber 16' described above in reference to FIG. 2.

In this example, each of the ink chamber 12' and the salt chamber 16' is sealed from the mixing chamber 36 until it is desirable to use the ink supply 40". The chambers 12, 16 are sealed by respective mechanisms 38, 38', which include a first docking portion 30A' associated with the ink chamber 12'; a second docking portion 30A" associated with the salt chamber 16'; a third docking portion 30B' and a fourth docking portion 30B" associated with the mixing chamber 36, the third docking portion 30B' to engage the first docking portion 30A' and the fourth docking portion 30B" to engage the second docking portion 30A"; wherein the first and third docking portions 30A', 30B' and the second and fourth docking portions 30A", 30B" seal the respective chambers 12', 16', 36 when unengaged, and respectively render the ink and mixing chambers 12' and 36 and the salt and mixing chambers 16' and 36 in fluid communication when engaged.

Any of the docking portion 30A, 30B previously described herein in reference to FIG. 2 may be used for the first, second, third and fourth docking portion 30A', 30B', 30A", 30B".

In one example, the ink chamber 12' contains the previously described liquid ink 14 and the salt chamber 16' contains the previously described salt solution 18. When it is desired to form the mixture using the ink supply 40", the first and third docking portions 30A', 30B' may be engaged and the second and fourth docking portions 30A", 30B" may be engaged. Engaging the first and third docking portions 30A', 30B' renders the ink and mixing chambers 12', 36 in fluid communication so that the liquid ink 14 empties into the mixing chamber 36. Engaging the second and fourth docking portions 30A", 30B" renders the salt and mixing chambers 16', 36 in fluid communication so that the salt solution 18 empties into the mixing chamber 36.

When both the liquid ink 14 and the salt solution 18 are dispensed into the mixing chamber 36, the mixture forms. In some examples, the mixing chamber 36 has a volume sufficient to contain all of the liquid ink 14 and all of the salt solution 18 contained in the respective chambers 12', 16'.

The mixing chamber 36 may be equipped with the mechanical mixing device and/or the ultrasonic mixer and/or the mixing device that irradiates the mixture with microwave or radio frequency radiation. This mixer/mixing device may be used in order to ensure sufficient and at least substantial uniform mixing within the predetermined time period (described below in reference to FIGS. 4 and 5).

In another example, the ink chamber 12' contains the previously described ink solvent 42 and the salt chamber 16' contains the previously described salt solution 18. In this example, the mixing chamber 36 may contain the described concentrated ink 44.

It is to be understood that when combined, the ink solvent 42 and the ink concentrate 44 form the liquid ink 14, having the component(s) previously described herein within the desired weight ranges previously described herein.

When it is desired to form the mixture (from the ink concentrate 44, the ink solvent 42, and the salt solution 18) using the ink supply 40", first and third docking portions 30A', 30B' may be engaged and the second and fourth docking portions 30A", 30B" may be engaged. Engaging the first and third docking portions 30A', 30B' renders the ink and mixing chambers 12', 36 in fluid communication so that the ink solvent 42 contained in the ink chamber 12' empties into the mixing chamber 36, which contains the ink concentrate 44. The mixing chamber 36 may be mechanically mixed, ultrasonicated, or otherwise mixed to form the liquid ink 14. Engaging the second and fourth docking portions 30A", 30B" renders the salt and mixing chambers 16', 36 in fluid communication so that the salt solution 18 empties into the mixing chamber 36.

When both the ink solvent 42 and the salt solution 18 are dispensed into the mixing chamber 36 containing the ink concentrate 44, the mixture forms. In some examples, the mixing chamber 36 has a volume sufficient to contain all of the ink solvent 42 and all of the salt solution 18 contained in the respective chambers 12', 16'.

In either of the previously described examples, the ink supply 40" may be an integrated print head that includes the ink supply components and the print head components directly attached to one another within the same unit. The print head components include those previously described, such as the thermal inkjet element 26, the continuous inkjet element 26', or the piezoelectric element 26", the nozzle(s) 28, and any additional inkjet architecture that may direct the mixture from the mixing chamber 36 to be ejected through the nozzle(s) 28. In one example of the integrated print head, the mixing chamber 36 may be in fluid communication with a firing chamber of the print head. In another example, the print head components (e.g., thermal inkjet element 26, the continuous inkjet element 26', or the piezoelectric element 26") may be part of a separate print head that is in fluid communication with the ink supply 40" (and in particular, the mixing chamber 36) through tubing on-board a printer.

Also disclosed herein is a method 100. An example of the method 100 is shown in FIG. 4. As shown at reference number 102, the method 100 comprises: providing an ink supply 10, 10' including: an ink chamber 12 containing a liquid ink 14; a salt chamber 16 containing a salt solution 18; a separator 20 positioned between the liquid ink 14 and the salt solution 18, wherein the separator 20 completely separates the liquid ink 14 from the salt solution 18 prior to a release mechanism 22 being triggered; and the release mechanism 22 having a triggered position and a retracted position, the triggered position causing the separator 20 to at least partially open, and enabling the liquid ink 14 and the salt solution 18 to be combined to form a mixture. This example of the method 100 may also be performed with ink supplies 40 and 40', except that the respective mechanisms 22A, 22B are moved into the triggered positions to form the mixture.

The ink supply 10, 10' and its components may be as described above in reference to FIGS. 1A and 1B, and the ink supply 40, 40' and its components may be as described above in reference to FIGS. 3A and 3B.

In some examples of the method 100, the method 100 further comprises moving the release mechanism 22 to the triggered position; and installing the ink supply 10, 10' in a printer within a predetermined time period (e.g., within 10 minutes) after the moving of the release mechanism 22 to the triggered position. In the examples disclosed herein, the shelf life begins when the mixture is formed, and thus installing the ink supply 10, 10' within this predetermined time period is desirable.

Moving the release mechanism 22 to the triggered position causes the separator 20 to at least partially open, and enables the liquid ink 14 and the salt solution 18 to be combined to form the mixture. In an example, the opening formed in the separator 20, by moving the release mechanism 22 to the triggered position, is of a size sufficient to enable the liquid ink 14 and the salt solution 18 to be combined to form the mixture. It is desired for the mixture to be at least substantially homogeneously/uniformly mixed (i.e., no salt concentration gradient in the mixture), and thus the opening may be as large as possible to ensure rapid and substantially even mixing. If the opening is too small, the immediate concentration of the salt could crash the pigments in contact with the salt inside of the chamber(s). In an example, the size of the opening ranges from about 1 mm to about 5 mm. In another example, several small openings may be formed that enable the fluids to mix in a desirable manner, and these small openings may have a size ranging from about 0.5 μm to about 2 μm.

In some examples, the method 100 may further comprise waiting for the liquid ink 14 and the salt solution 18 to become sufficiently mixed (i.e., to become at least substantially uniformly mixed) prior to installing the ink supply 10, 10' in the printer. The mixing time depends, in part, upon the concentration of the salt in the salt solution 18. With a salt content at 1.5 wt % or higher in the salt solution 18, sufficient mixing and at least substantial uniform mixing will occur within seconds. With this salt content, the liquid ink 14 and the salt solution 18 may be sufficiently mixed within 5 seconds to 15 minutes after moving the release mechanism 22 to the triggered position. With a lower salt content, the mixing time may be longer, e.g., from 15 minutes to about 1 hour.

Moreover, the time it takes for the mixture to become sufficiently mixed may depend upon the size of the chamber 12, 16 in which the liquid ink and salt solution 18 are mixed. A smaller chamber 12, 16 may involve less time to achieve sufficient mixing.

In some other examples, the method 100 may further comprise shaking the ink supply 10, 10', or agitating the ink supply 10, 10', or activating a mixer (e.g., mechanical, ultrasonic, microwave, RF, etc.) attached to the ink supply 10, 10', after the separator 20 is at least partially opened by moving the release mechanism 22 to the triggered position. In these examples, the shaking or agitating or activating of the mixer may assist the liquid ink 14 and the salt solution 18 in becoming sufficiently mixed. As an example, when the ink supply 10, 10' is shaken or agitated or mixed via a mixer, the liquid ink 14 and the salt solution 18 may be sufficiently mixed within about 5 seconds to about 2 minutes, or to about 5 minutes, after moving the release mechanism 22 to the triggered position.

In some examples of the method 100, the release mechanism 22 may be moved back to the retracted position after the opening is formed in the separator 20. It may be desirable to move the release mechanism 22 back to the retracted position or to an anchored position when the release mechanism 22 is capable of plugging or otherwise blocking the opening. Moving the release mechanism 22 back to the retracted position or to an anchored may remove the release mechanism 22 from the opening and better enable the liquid ink 14 and the salt solution 18 to be combined to form the mixture. As one example, a pin or needle release mechanism may be moved back to the retracted position to free up the opening. As another example, a plug release mechanism may be secured in an anchored position away from the opening so that the plug does not get pulled into the opening where it would interfere with the mixing.

Installing the ink supply 10, 10' in the printer enables the mixture to be printed. In some examples of the method 100, the printer is a thermal inkjet printer, a continuous inkjet printer, or a piezoelectric inkjet printer; and the method 100 further comprises jetting the mixture. The jetting may be accomplished by thermal inkjet printing, continuous inkjet printing, or piezoelectric inkjet printing. The type of printing may correspond to the type of printer in which the ink supply 10, 10' is installed. The jetting of the mixture may be on a substrate. The substrate may be coated or uncoated paper. In an example, the substrate may be non-ColorLok® office media.

In some examples of the method 100, the method 100 further comprises one or more of: storing the ink supply 10, 10'; transporting ink supply 10, 10'; exposing ink supply 10, 10' to a high temperature at or above 60° C.; or exposing the ink supply 10, 10' to a temperature as low 15° C., or 5° C., or −70° C., depending upon the concentration of the salt solution 18 and whether the salt precipitates out of solution at a particular low temperature. In these examples, the storing, transporting, and/or exposing (to the high temperature or the low temperature) of the ink supply 10, 10' may be prior to moving the release mechanism 22 to the triggered position. The separation of the liquid ink 14 from the salt solution 18 during the storing, transporting, and/or exposing of the ink supply 10, 10' may render the ink supply 10, 10' more stable throughout storage, transport, and/or exposure to high and/or low temperatures, e.g., when compared to an ink including the salt therein throughout the storing, transporting, and/or exposing.

Also disclosed herein is a method 200. An example of the method 200 is shown in FIG. 5. As shown at reference number 202, the method 200 comprises: providing an ink supply 10" including: an ink chamber 12' containing a liquid ink 14, the ink chamber 12' having a first docking portion 30A; a salt chamber 16' containing a salt solution 18, the salt chamber 16' having a second docking portion 30B that is to engage the first docking portion 30A; wherein the first and second docking portions 30A, 30B seal the respective ink and salt chambers 12', 16' when unengaged, and render the ink and salt chambers 12', 16' in fluid communication when engaged so that the liquid ink 14 and the salt solution 18 combine to form a mixture. This example of the method 200 may also be performed with ink supply 40", except that the respective docking portions 30A', 30B' and 30A", 30B" are engaged to form the mixture.

The ink supply 10" and its components may be as described above in reference to FIG. 2. The ink supply 40" and its components may be as described above in reference to FIG. 3C.

In some examples of the method 200, the method 200 further comprises engaging the first and second docking portions 30A, 30B; and installing the ink supply 10" in a printer within a predetermined time (e.g., within about 10 minutes) after the engaging of the first and second docking portions 30A, 30B. In the examples disclosed herein, the shelf life begins when the mixture is formed, and thus installing the ink supply 10" within this predetermined time period is desirable.

Engaging the first and second docking portions 30A, 30B renders the ink and salt chambers 12', 16' in fluid communication so that the liquid ink 14 and the salt solution 18 combine to form the mixture. The first and second docking portions 30A, 30B through which the ink and salt chambers 12', 16' are in fluid communication (when the first and second docking portions 30A, 30B are engaged) are of a size sufficient to enable the liquid ink 14 and the salt solution 18 to be combined to form the mixture. It is desired for the mixture to be at least substantially homogeneously/uniformly mixed (i.e., no salt concentration gradient in the mixture), and thus the opening formed by the engaged docking portions 30A, 30B may be as large as possible to ensure rapid and substantially even mixing. If the opening is too small, the immediate concentration of the salt could crash the pigments in contact with the salt inside of the chamber(s). In an example, the size of the opening(s) through which the ink and salt chambers 12', 16' are in fluid communication ranges from about 1 mm to about 5 mm. In another example, several small openings may be formed that enable the fluids to mix in a desirable manner, and these small openings may have a size ranging.

In some examples, the method 200 may further comprise waiting for the liquid ink 14 and the salt solution 18 to become sufficiently mixed (i.e., to become at least substantially uniformly mixed) prior to installing the ink supply 10, 10' in the printer. The mixing time depends, in part, upon the concentration of the salt in the salt solution 18. With a salt content at 1.5 wt % or higher in the salt solution 18, sufficient mixing and at least substantial uniform mixing will occur within seconds. With this salt content, the liquid ink 14 and the salt solution 18 may be sufficiently mixed within 5 seconds to 15 minutes after engaging the first and second docking portions 30A, 30B. With a lower salt content, the mixing time may be longer, e.g., from 15 minutes to about 1 hour.

Moreover, the time it takes for the mixture to become sufficiently mixed may depend upon the size of the chamber 12', 16' in which the liquid ink and salt solution 18 are mixed. A smaller chamber 12', 16' may involve less time to achieve sufficient mixing.

In some other examples, the method 200 may further comprise shaking the ink supply 10", or agitating the ink supply 10", or activating a mixer (e.g., mechanical, ultrasonic, microwave, RF, etc.) attached to the ink supply 10" after the ink and salt chambers 12', 16' are put in fluid communication by engaging the first and second docking portions 30A, 30B. In these examples, the shaking or agitating or activating of the mixer may assist the liquid ink 14 and the salt solution 18 in becoming sufficiently mixed.

As an example, when the ink supply 10" is shaken or agitated or mixed via a mixer, the liquid ink 14 and the salt solution 18 may be sufficiently mixed within about 5 seconds to about 2 minutes, or to about 5 minutes after engaging the first and second docking portions 30A, 30B.

Installing the ink supply 10" in the printer enables the mixture to be printed. In some examples of the method 200, the printer is a thermal inkjet printer, a continuous inkjet printer, or a piezoelectric inkjet printer; and the method 200 further comprises jetting the mixture. The jetting may be accomplished by thermal inkjet printing, continuous inkjet printing, or piezoelectric inkjet printing. The type of printing may correspond to the type of printer in which the ink supply 10" is installed. The jetting of the mixture may be on a substrate. The substrate may be coated or uncoated paper. In an example, the substrate may be non-ColorLok® office media.

In some examples of the method 200, the method 200 further comprises one or more of storing the ink supply 10"; transporting ink supply 10"; exposing ink supply 10" to a high temperature at or above 60° C.; or exposing the ink supply 10" to a temperature as low 15° C., or 5° C., or −70° C., depending upon the concentration of the salt solution 18 and whether the salt precipitates out of solution at a particular low temperature. In these examples, the storing, transporting, and/or exposing (to the high temperature or the low temperature) of the ink supply 10" may be prior to engaging the first and second docking portions 30A, 30B. The separation of the liquid ink 14 from the salt solution 18 during the storing, transporting, and/or exposing of the ink supply 10" may render the ink supply 10" more stable throughout storage, transport, and/or exposure to high and/or low temperatures, e.g., when compared to an ink including the salt therein throughout the storing, transporting, and/or exposing.

To further illustrate the present disclosure, examples are given herein. It is to be understood that these examples are provided for illustrative purposes and are not to be construed as limiting the scope of the present disclosure.

EXAMPLES

Example 1

Examples of the liquid ink and examples of the mixture were prepared. The general formulations of the examples of the liquid ink were the same as the general formulations of the examples of the mixture, except that the examples of the mixture were prepared with potassium chloride (KCl) salt and the examples of the liquid ink were prepared without salt. The example liquid inks and the example mixtures were prepared with either a cyan pigment, a magenta pigment, or a yellow pigment. The general formulation of the each of the example liquid inks and the example mixtures are shown in Table 1, with the wt % of each component that was used.

TABLE 1

| Ingredient | Specific Component | Cyan Ink (wt %) | Magenta Ink (wt %) | Yellow Ink (wt %) | Cyan Mixture (wt %) | Magenta Mixture (wt %) | Yellow Mixture (wt %) |
|---|---|---|---|---|---|---|---|
| Co-solvent | 2-pyrrolidone | 9.00 | 9.00 | 9.00 | 9.00 | 9.00 | 9.00 |
|  | Trimethylolpropane | 10.00 | 10.00 | 10.00 | 10.00 | 10.00 | 10.00 |
| Humectant | Glycerol | 4.00 | 4.00 | 4.00 | 4.00 | 4.00 | 4.00 |
|  | LEG-1 | 0.75 | 0.75 | 0.75 | 0.75 | 0.75 | 0.75 |
| Surfactant | TERGITOL ® TMN-6 | 0.72 | 0.72 | 0.72 | 0.72 | 0.72 | 0.72 |
| Biocide | ACTICIDE ® B20 | 0.16 | 0.16 | 0.16 | 0.16 | 0.16 | 0.16 |
|  | ACTICIDE ® M20 | 0.07 | 0.07 | 0.07 | 0.07 | 0.07 | 0.07 |
| Binder | urethane acrylate | 1.00 | 2.00 | 1.00 | 1.00 | 2.00 | 1.00 |
| Salt | Potassium chloride | 0.00 | 0.00 | 0.00 | 0.60 | 0.45 | 0.45 |
| Colorant | Cyan pigment | 6.00 | 0.00 | 0.00 | 6.00 | 0.00 | 0.00 |
|  | Magenta pigments | 0.00 | 6.00 | 0.00 | 0.00 | 6.00 | 0.00 |
|  | Yellow pigment | 0.00 | 0.00 | 6.00 | 0.00 | 0.00 | 6.00 |
| Water |  | Balance | Balance | Balance | Balance | Balance | Balance |

The example liquid inks and the example mixtures were jetted using a thermal inkjet printer on HP Multipurpose Ultra White ColorLok® media (HP-UW), Georgia Pacific copy and print non-ColorLok® office paper (GP-SPEC) media, Hammermill Great White 30% recycled non-ColorLok® office paper (GW30) media, and Staples copy and print (SCP) non-ColorLok® media.

A cyan (C) print, a magenta (M) print, a yellow (Y) print, a red (R) print, a green (G) print, and a blue (B) print was created on each type of media with the example liquid inks, and a cyan (C) print, a magenta (M) print, a yellow (Y) print, a red (R) print, a green (G) print, and a blue (B) print was created on each type of media with the example mixtures. To create the cyan (C) prints, the cyan ink and the cyan mixture were respectively used. To create the magenta (M) prints, the magenta ink and the magenta mixture were respectively used. To create the yellow (Y) prints, the yellow ink and the yellow mixture were respectively used. To create the red (R) prints, a combination of the magenta and yellow inks or a combination of the magenta and yellow mixtures were used. To create the green (G) prints, a combination of the cyan and yellow inks or a combination of the cyan and yellow mixtures were used. To create the blue (B) prints, a combination of the cyan and magenta inks or a combination of the cyan and magenta mixtures were used.

Then, the saturation of each print was measured. The saturation of each print was measured in terms of chroma divided by lightness (i.e., C/L*). The results of the saturation measurements for the prints formed from the example liquid inks are shown below in Table 2, and the results of the saturation measurements for the prints formed from the example mixtures are shown below in Table 3. In both Table 2 and Table 3, the rows identify the type of media (i.e., HPUW, GP-SPEC, GW30, or SCP) used in the print and the columns identify the color of the print (i.e., cyan (C), magenta (M), yellow (Y), red (R), green (G), or blue (B)).

TABLE 2

Prints formed with Liquid Inks

| Media ↓ | Saturation (C/L*) | | | | | |
|---|---|---|---|---|---|---|
| | C | M | Y | R | G | B |
| HPUW | 1.48 | 1.51 | 1.07 | 1.41 | 1.01 | 1.48 |
| GP-SPEC | 0.98 | 1.08 | 0.89 | 1.00 | 0.76 | 0.87 |
| GW30 | 1.02 | 1.15 | 0.94 | 1.05 | 0.83 | 0.92 |
| SCP | 0.96 | 1.05 | 0.89 | 0.97 | 0.75 | 0.83 |

TABLE 3

Prints formed with Mixtures

| Media ↓ | Saturation (C/L*) | | | | | |
|---|---|---|---|---|---|---|
| | C | M | Y | R | G | B |
| HPUW | 1.40 | 1.52 | 1.07 | 1.39 | 0.93 | 1.39 |
| GP-SPEC | 1.09 | 1.18 | 0.94 | 1.13 | 0.83 | 1.02 |
| GW30 | 1.17 | 1.29 | 1.00 | 1.25 | 0.91 | 1.11 |
| SCP | 1.05 | 1.14 | 0.92 | 1.09 | 0.78 | 0.93 |

As shown in Tables 2 and 3, the prints formed from the example mixtures have improved saturation on GP-SPEC media, GW30 media, and SCP media (and comparable saturation on HPUW media) over the prints formed from the example liquid inks. In particular, the prints formed from the example mixtures have improved saturation on GP-SPEC media and GW30 media for red (R), green (G), and blue (B) over the prints formed from the example liquid inks.

Example 2

The example liquid inks and the example mixtures from Example 1 were also tested for stability. Each example liquid ink and example mixture was stored in an accelerated storage (AS) environment at a temperature of 60° C. for 12 weeks. The particle size in nm of the pigment for each example liquid ink and example mixture was measured before the formulations were stored in the AS environment (i.e., at 0 weeks), after 1 week in the AS environment, after 2 weeks in the AS environment, after 3 weeks AS environment, after 4 weeks in the AS environment, after 6 weeks in the AS environment, after 8 weeks in the AS environment, and after 12 weeks in the AS environment. The particle size (volume-weighted mean diameter) was determined via dynamic light scattering with a Microtrac nanowave particle size analyzer. The results of the particle size measurements are shown below in Table 4.

TABLE 4

| | 0 weeks | 1 week | 2 weeks | 3 weeks | 4 weeks | 6 weeks | 8 weeks | 12 weeks |
|---|---|---|---|---|---|---|---|---|
| Cyan Ink | 101.1 | 100.8 | 101.6 | 100.3 | 101.9 | 101.8 | 100.3 | 99.3 |
| Magenta Ink | 144.1 | 147.5 | 147.0 | 145.7 | 144.1 | 146.7 | 142.8 | 152.3 |
| Yellow Ink | 126.1 | 128.7 | 128.4 | 124.6 | 129.1 | 127.2 | 126.1 | 123.9 |
| Cyan Mixture | 92.8 | 92.0 | 93.1 | 94.5 | 93.6 | 93.9 | 93.6 | 95.4 |
| Magenta Mixture | 138.0 | 558.0 | 287.1 | 467.0 | 460.0 | 477.0 | 560.0 | 611.0 |
| Yellow Mixture | 116.3 | 117.5 | 119.8 | 121.0 | 127.0 | 160.3 | 584.0 | 964.0 |

As shown in Table 4, the example magenta ink and the example yellow ink have particle size changes that are much less than the particle size changes of the example magenta mixture and the example yellow mixture. The example magenta mixture exhibits an unacceptable particle size change after 1 week in the AS environment, and the example yellow mixture exhibits an unacceptable particle size change after 6 weeks in the AS environment. In contrast, each of the example inks maintain an acceptable particle size change after 12 weeks in the AS environment. This indicates that the example magenta mixture and the example yellow mixture have reduced stability and shelf life as compared to the example magenta ink and the example yellow ink. Both the cyan ink and mixture maintained an acceptable particle size change after 12 weeks. These results indicate that the cyan pigments used are more stable than the magenta and yellow pigments that were used. It is believed that over a longer test period, the cyan mixture (including salt) would behave similarly to the yellow and magenta mixtures, and would exhibit a greater particle size change than the cyan ink (without salt).

It is to be understood that the ranges provided herein include the stated range and any value or sub-range within the stated range. For example, a range from about 45° C. to about 60° C. should be interpreted to include not only the explicitly recited limits of from about 45° C. to about 60° C., but also to include individual values, such as 45.35° C., 50.5° C., 53.85° C., 57° C., etc., and sub-ranges, such as from about 45.35° C. to about 59° C., from about 51.5° C. to about 57° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An ink supply, comprising:
   an ink chamber containing a liquid ink;
   a salt chamber containing a salt solution;
   a separator positioned between the liquid ink and the salt solution, wherein the separator completely separates the liquid ink from the salt solution prior to a release mechanism being triggered; and
   the release mechanism having a triggered position and a retracted position, the triggered position causing the separator to at least partially open, and enabling the liquid ink and the salt solution to be combined to form a mixture.

2. The ink supply as defined in claim 1 wherein the liquid ink is devoid of a salt contained in the salt solution.

3. The ink supply as defined in claim 1 wherein the salt solution includes a solvent and a salt selected from the group consisting of mono-valent metallic salts, multi-valent metallic salts, and organo-metallic salts, wherein the metallic salt includes (i) a cation of a metal selected from the group consisting of Group I metals, Group II metals, Group III metals, transition metals, and combinations thereof, and (ii) an anion selected from the group consisting of chloride, iodide, bromide, nitrate, sulfate, sulfite, phosphate, chlorate, acetate, borate, tetrafluoroborate, propionate, and combinations thereof.

4. The ink supply as defined in claim 1 wherein the release mechanism is selected from the group consisting of a pin, a hollow needle, a shutter, a plunger, a lever, a roller, a hammer, a pull-ribbon, a pull-tab, a screw, a wedge, a vane, a valve, a spool, an impeller, a thread, a plug, a vice, and a combination thereof.

5. The ink supply as defined in claim 1, further comprising an inkjet cartridge housing defining the ink chamber and the salt chamber, wherein the inkjet cartridge housing includes:
a thermal inkjet element, a continuous inkjet element, or a piezoelectric element to generate a mixture droplet or a stream of mixture droplets; and
a nozzle for dispensing the mixture droplet or the stream of mixture droplets.

6. The ink supply as defined in claim 1 wherein the ink chamber has a volume sufficient to contain the liquid ink and the salt solution.

7. An ink supply, comprising:
an ink chamber containing a liquid ink, the ink chamber having a first docking portion; and
a salt chamber containing a salt solution, the salt chamber having a second docking portion that is to engage the first docking portion;
wherein the first and second docking portions seal the respective ink and salt chambers when unengaged, and render the ink and salt chambers in fluid communication when engaged so that the liquid ink and the salt solution combine to form a mixture.

8. The ink supply as defined in claim 7 wherein the liquid ink is devoid of a salt contained in the salt solution.

9. The ink supply as defined in claim 7 wherein the salt solution includes a solvent and a salt selected from the group consisting of mono-valent metallic salts, multi-valent metallic salts, and organo-metallic salts, wherein the metallic salt includes (i) a cation of a metal selected from the group consisting of Group I metals, Group II metals, Group III metals, transition metals, and combinations thereof, and (ii) an anion selected from the group consisting of chloride, iodide, bromide, nitrate, sulfate, sulfite, phosphate, chlorate, acetate, borate, tetrafluoroborate, propionate, and combinations thereof.

10. The ink supply as defined in claim 7 wherein the ink chamber has a volume sufficient to contain the liquid ink and the salt solution.

11. The ink supply as defined in claim 7 wherein the ink chamber or the salt chamber is an inkjet cartridge housing including:
a thermal inkjet element, a continuous inkjet element, or a piezoelectric element to generate a mixture droplet or a stream of mixture droplets; and
a nozzle for dispensing the mixture droplet or the stream of mixture droplets.

12. An ink supply, comprising:
an ink chamber;
a salt chamber containing a salt solution;
a mixing chamber in selective fluid communication with each of the ink chamber and the salt chamber; and
respective mechanisms i) sealing the ink chamber from the mixing chamber and sealing the salt chamber from the mixing chamber when unengaged or prior to a release mechanism being triggered; and ii) rendering the ink chamber and the mixing chamber in fluid communication and rendering the salt chamber and the mixing chamber in fluid communication when engaged or subsequent to the release mechanism being triggered, so that at least some of the salt solution can combine, in the mixing chamber, with an ink component to form a mixture.

13. The ink supply as defined in claim 12 wherein:
i) the ink component is a liquid ink devoid of a salt contained in the salt solution, and wherein the ink chamber contains the liquid ink; or
ii) the ink component includes an ink solvent devoid of a salt contained in the salt solution and a concentrated ink devoid of the salt contained in the salt solution, the ink chamber contains the ink solvent, and the mixing chamber contains the concentrated ink; or
iii) the ink component includes an ink solvent devoid of a salt contained in the salt solution and a concentrated ink devoid of the salt contained in the salt solution, and the ink chamber includes separate sub-chambers respectively containing the ink solvent and the concentrated ink.

14. The ink supply as defined in claim 12 wherein:
the mechanisms include:
a first separator positioned between the ink chamber and the mixing chamber; and
a second separator positioned between the salt chamber and the mixing chamber; and
the release mechanism includes:
a first release mechanism having a first triggered position and a first retracted position, the first triggered position causing the first separator to at least partially open; and
a second release mechanism having a second triggered position and a second retracted position, the second triggered position causing the second separator to at least partially open.

15. The ink supply as defined in claim 12 wherein the mechanisms include:
a first docking portion associated with the ink chamber;
a second docking portion associated with the salt chamber;
a third docking portion and a fourth docking portion associated with the mixing chamber, the third docking portion to engage the first docking portion and the fourth docking portion to engage the second docking portion;
wherein the first and third docking portions and the second and fourth docking portions seal the respective chambers when unengaged, and respectively render the ink and mixing chambers and the salt and mixing chambers in fluid communication when engaged.

* * * * *